United States Patent
Da Silva et al.

(10) Patent No.: US 12,191,957 B2
(45) Date of Patent: *Jan. 7, 2025

(54) RESOLVING AMBIGUITIES RELATED TO NR CELL QUALITY DERIVATION

(71) Applicant: Telefonaktiebolaget LM Ericsson (publ), Stockholm (SE)

(72) Inventors: Icaro L. J. Da Silva, Solna (SE); Pradeepa Ramachandra, Linköping (SE); Helka-Liina Määttänen, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/465,330

(22) Filed: Sep. 12, 2023

(65) Prior Publication Data

US 2024/0030987 A1    Jan. 25, 2024

Related U.S. Application Data

(63) Continuation of application No. 17/864,083, filed on Jul. 13, 2022, now Pat. No. 11,799,534, which is a (Continued)

(51) Int. Cl.
*H04B 7/04* (2017.01)
*H04B 7/0408* (2017.01)
(Continued)

(52) U.S. Cl.
CPC ......... *H04B 7/0632* (2013.01); *H04B 7/0408* (2013.01); *H04B 7/0617* (2013.01);
(Continued)

(58) Field of Classification Search
None
See application file for complete search history.

(56) References Cited

U.S. PATENT DOCUMENTS

2016/0353512 A1   12/2016   Lu et al.
2018/0139666 A1   5/2018   Ahmavaara et al.
(Continued)

FOREIGN PATENT DOCUMENTS

RU       2623736 C2      6/2017

OTHER PUBLICATIONS

Author Unknown, "Technical Specification Group Radio Access Network; Evolved Universal Terrestrial Radio Access (E-UTRA); Radio Resource Control (RRC); Protocol specification (Release 13)," Technical Specification 36.331, Version 13.8.1, Jan. 2018, 3GPP Organizational Partners, 644 pages.

(Continued)

*Primary Examiner* — Scott M Sciacca
(74) *Attorney, Agent, or Firm* — Withrow & Terranova, PLLC

(57) ABSTRACT

Systems and methods are disclosed herein for enabling a User Equipment (UE) to perform cell quality derivation in a wireless communication network utilizing parameters from an appropriate measurement object. In some embodiments, a method of operation of a UE to perform cell quality derivation in a wireless communication network includes the UE receiving, via Radio Resource Control (RRC) signaling, a measurement configuration that includes a list of measurement objects. The UE receives a serving cell configuration including frequency information that specifies an absolute frequency of a Synchronization Signal block (SSB) corresponding to a serving cell. The UE selects a measurement object in the list of measurement objects that specifies an SSB frequency having a same value as the specified absolute frequency.

27 Claims, 15 Drawing Sheets

Related U.S. Application Data continuation of application No. 16/962,611, filed as application No. PCT/IB2019/051300 on Feb. 18, 2019, now Pat. No. 11,489,576.

(60) Provisional application No. 62/632,292, filed on Feb. 19, 2018.

(51) Int. Cl.
  *H04B 7/06* (2006.01)
  *H04L 5/00* (2006.01)
  *H04W 24/10* (2009.01)
  *H04W 56/00* (2009.01)

(52) U.S. Cl.
  CPC ......... *H04B 7/0626* (2013.01); *H04L 5/0051* (2013.01); *H04W 24/10* (2013.01); *H04W 56/001* (2013.01)

(56) References Cited

U.S. PATENT DOCUMENTS

| | | | | |
|---|---|---|---|---|
| 2018/0359149 | A1* | 12/2018 | Shaheen | H04W 72/0453 |
| 2019/0140752 | A1 | 5/2019 | Annam et al. | |
| 2019/0215861 | A1* | 7/2019 | Son | H04W 72/23 |
| 2020/0267583 | A1 | 8/2020 | Cheng et al. | |
| 2020/0314946 | A1 | 10/2020 | Tsuboi et al. | |
| 2020/0404537 | A1* | 12/2020 | Harada | H04L 5/0053 |
| 2021/0175985 | A1* | 6/2021 | Yoon | H04W 56/00 |

OTHER PUBLICATIONS

Author Unknown, "Technical Specification Group Radio Access Network; Evolved Universal Terrestrial Radio Access (E-UTRA); Radio Resource Control (RRC); Protocol specification (Release 15)," Technical Specification 36.331, Version 15.0.1, Jan. 2018, 3GPP Organizational Partners, 776 pages.

Author Unknown, "Technical Specification Group Radio Access Network; Evolved Universal Terrestrial Radio Access (E-UTRA); Radio Resource Control (RRC); Protocol specification (Release 15)," Technical Specification 36.331, Version 15.3.0, Sep. 2018, 3GPP Organizational Partners, 918 pages.

Author Unknown, "Technical Specification Group Radio Access Network; NR; Requirements for support of radio resource management (Release 15)," Technical Specification 38.133, Version 15.0.0, Dec. 2017, 3GPP Organizational Partners, 41 pages.

Author Unknown, "Technical Specification Group Radio Access Network; NR; Radio Resource Control (RRC) protocol specification (Release 15)," Technical Specification 38.331, Version 15.0.0, Dec. 2017, 3GPP Organizational Partners, 188 pages.

Ericsson, "R2-180xxxx: Corrections on EN-DC," Change Request based on R2-1801218, 3GPP TSG-RAN WG2 Meeting #101, Feb. 26-Mar. 2, 2018, Athens, Greece, pp. 38-39, 46 and pp. 52, 94-95.

Ericsson, "R2-1801319: Remaining details for MO definition," 3GPP TSG-RAN WG2 NR-Ah#1801, Jan. 22-26, 2018, Vancouver, Canada, 12 pages.

Ericsson, "R2-1803449: Identification of measurement object corresponding to the serving carrier," 3GPP TSG-RAN WG2 NR #101, Feb. 26-Mar. 2, 2018, Athens, Greece, 10 pages.

Ericsson, "R2-1803485: Ambiguities in event definition," 3GPP TSG-RAN WG2 NR #101, Feb. 26-Mar. 2, 2018, Athens, Greece, 7 pages.

Vivo, "R2-1801596: Clarification on remaining issues of MO content," 3GPP TSG-RAN WG2 NR Ad hoc 1801, Jan. 22-26, 2018, Vancouver, Canada, 3 pages.

Examination Report No. 1 for Australian Patent Application No. 2019221308, mailed Jan. 28, 2021, 4 pages.

Examination Report No. 2 for Australian Patent Application No. 2019221308, mailed Sep. 3, 2021, 3 pages.

Examination Report for European Patent Application No. 19711707.0, mailed Nov. 2, 2022, 6 pages.

International Search Report and Written Opinion for International Patent Application No. PCT/IB2019/051300, mailed May 15, 2019, 10 pages.

Non-Final Office Action for U.S. Appl. No. 17/864,083, mailed Mar. 16, 2023, 9 pages.

Notice of Allowance and Examiner-Initiated Interview Summary for U.S. Appl. No. 17/864,083, mailed Jul. 10, 2023, 13 pages.

* cited by examiner

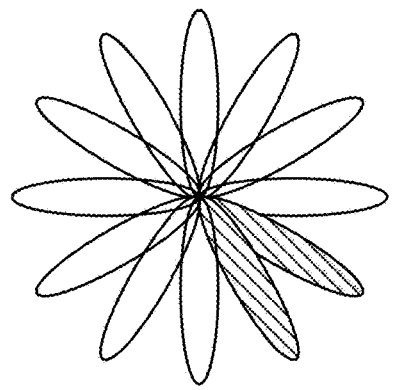
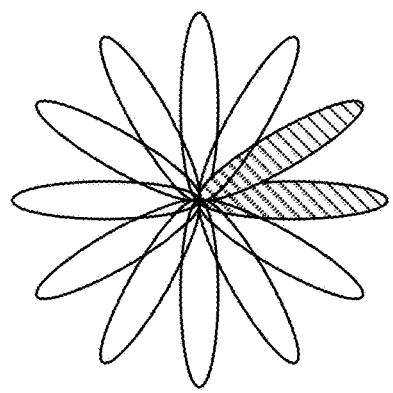
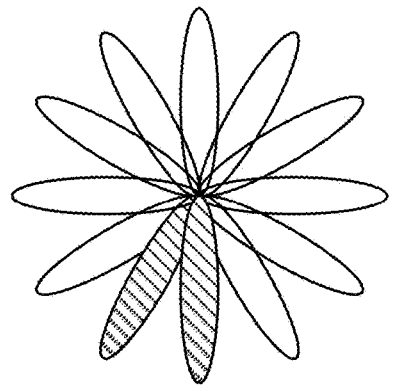
*FIG. 2A*
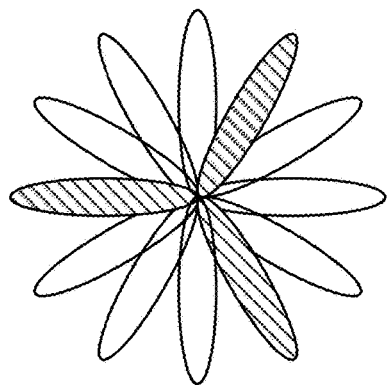
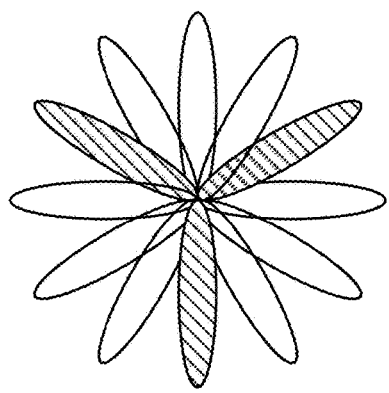
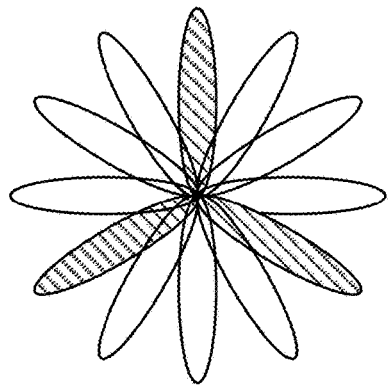
*FIG. 2B*

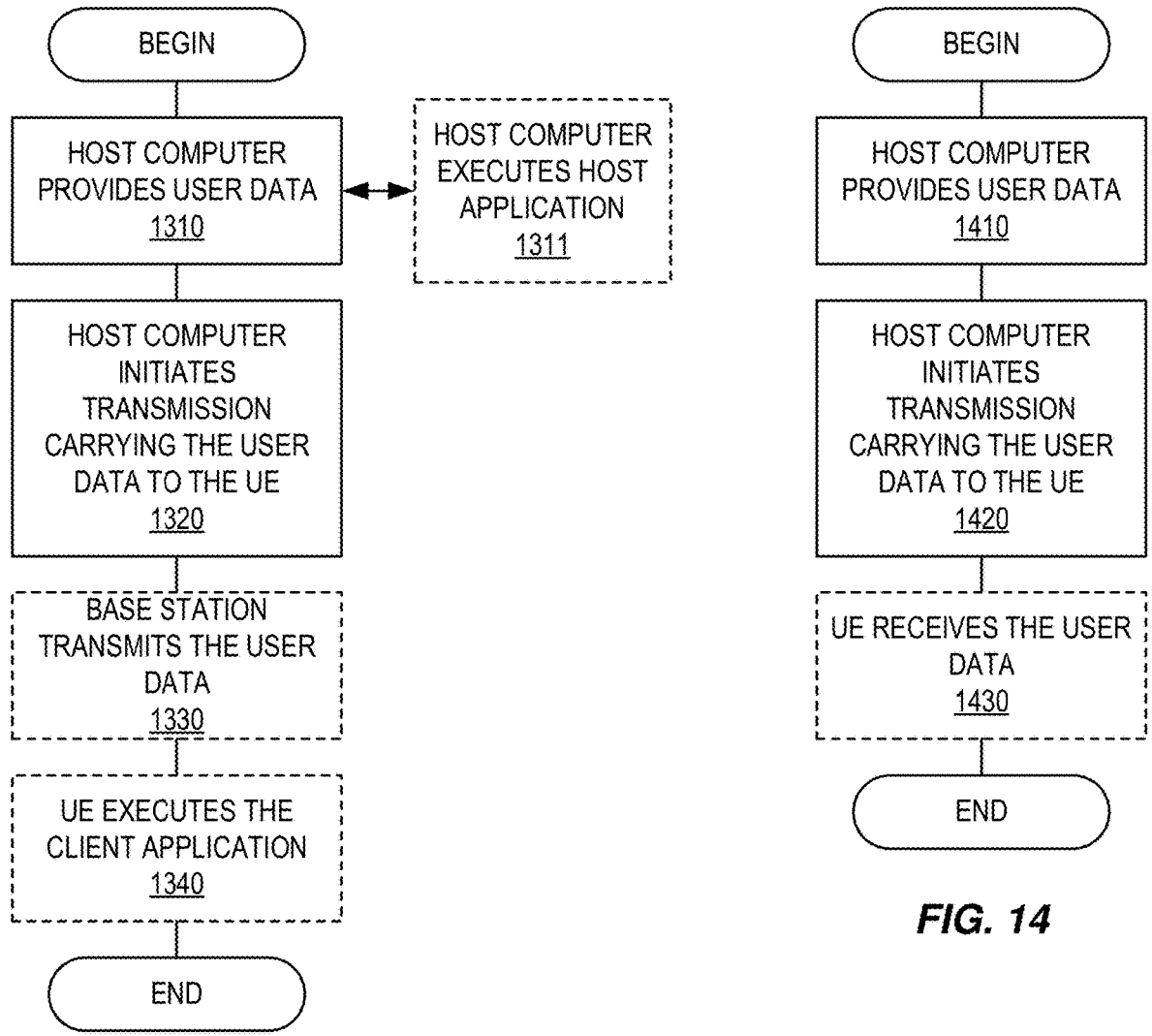

RESOLVING AMBIGUITIES RELATED TO NR CELL QUALITY DERIVATION

RELATED APPLICATIONS

The present application is a continuation of U.S. Nonprovisional patent application Ser. No. 17/864,083, filed Jul. 13, 2022, which is a continuation of U.S. Nonprovisional patent application Ser. No. 16/962,611, filed Jul. 16, 2020, now U.S. Pat. No. 11,489,576, which is a 371 of International Application No. PCT/IB2019/051300, filed Feb. 18, 2019, which claims the benefit of and priority to U.S. Provisional Patent Application No. 62/632,292, filed Feb. 19, 2018, entitled "RESOLVING AMBIGUITIES RELATED TO NR CELL QUALITY DERIVATION," the disclosures of which are hereby incorporated herein by reference in their entirety.

TECHNICAL FIELD

The present disclosure relates to a wireless communication network and, in particular, to cell quality derivation in a wireless communication network.

BACKGROUND

New Radio (NR) and Beamforming

Multi-antenna schemes for Third Generation Partnership Program (3GPP) NR (also referred to as "Fifth Generation (5G)") are currently being discussed in 3GPP. For NR, frequency ranges up to 100 Gigahertz (GHz) are considered. High-frequency radio communication above 6 GHz suffers from significant path loss and penetration loss. Therefore, Multiple Input Multiple Output (MIMO) schemes for NR are considered.

With massive MIMO, three approaches to beamforming have been discussed, namely, analog beamforming, digital beamforming, and hybrid beamforming (i.e., a combination of analog and digital beamforming). An example diagram for hybrid beamforming is shown in FIG. 1. Beamforming can be on transmission beams and/or reception beams, network side or User Equipment (UE) side.

The analog beam of a subarray can be steered toward a single direction on each Orthogonal Frequency Division Multiplexing (OFDM) symbol, and hence the number of subarrays determines the number of beam directions and the corresponding coverage on each OFDM symbol. However, the number of beams to cover the whole serving area is typically larger than the number of subarrays, especially when the individual beam width is narrow. Therefore, to cover the whole serving area, multiple transmissions with narrow beams differently steered in the time domain are also likely to be needed. The provision of multiple narrow coverage beams for this purpose has been called "beam sweeping". For analog and hybrid beamforming, the beam sweeping seems to be essential to provide the basic coverage in NR. For this purpose, multiple OFDM symbols, in which differently-steered beams can be transmitted through subarrays, can be assigned and periodically transmitted. Two examples of this beam sweeping are shown in FIGS. 2A and 2B. However, other examples using differing numbers of subarrays are also possible.

Synchronization Signal (SS) Block Configuration

Herein, a non-limiting example of SS block and SS burst configuration are described, which may be assumed for the description provided herein. The signals comprised in an SS block may be used for measurements on a NR carrier, including intra-frequency measurements, inter-frequency measurements, and inter Radio Access Technology (RAT) measurements (i.e., NR measurements from another RAT).

SS Block (also referred to as SS/Physical Broadcast Channel (PBCH) Block or SSB): NR Primary Synchronization Signal (NR-PSS), NR Secondary Synchronization Signal (NR-SSS), and/or NB PBCH (NR-PBCH) can be transmitted within an SS block. For a given frequency band, an SS block corresponds to N OFDM symbols based on one subcarrier spacing (e.g., default or configured), and N is a constant. UEs are able to identify at least the OFDM symbol index, the slot index in a radio frame, and the radio frame number from an SS block. A single set of possible SS block time locations (e.g., with respect to a radio frame or with respect to an SS burst set) is specified per frequency band. At least for the multi-beam case, at least the time index of the SS block is indicated to the UE. The position(s) of actual transmitted SS blocks can be informed for helping CONNECTED/IDLE mode measurement, for helping CONNECTED mode UE to receive downlink (DL) data/control in unused SS blocks, and potentially for helping IDLE mode UE to receive DL data/control in unused SS blocks. The maximum number of SS blocks within an SS burst set, L, for different frequency ranges is as follows:

for frequency range up to 3 GHz, L is 4,
for frequency range from 3 GHz to 6 GHz, L is 8, and
for frequency range from 6 GHz to 52.6 GHz, L is 64

SS Burst Set: One or multiple SS burst(s) further compose an SS burst set (or series), where the number of SS bursts within a SS burst set is finite. From the physical layer specification perspective, at least one periodicity of an SS burst set is supported. From the UE perspective, SS burst set transmission is periodic. At least for initial cell selection, the UE may assume a default periodicity of SS burst set transmission for a given carrier frequency (e.g., one of 5 milliseconds (ms), 10 ms, 20 ms, 40 ms, 80 ms, or 160 ms). The UE may assume that a given SS block is repeated with a SS burst set periodicity. By default, the UE may neither assume the NR base station (gNB) transmits the same number of physical beam(s) nor the same physical beam(s) across different SS blocks within an SS burst set. In a special case, an SS burst set may comprise one SS burst.

For each carrier, the SS blocks may be time-aligned or overlap fully or at least in part, or the beginning of the SS blocks may be time-aligned (e.g., when the actual number of transmitted SS blocks is different in different cells).

An example configuration of SS blocks, SS bursts, and SS burst sets or series is shown in FIG. 3.

All SS blocks within a burst set are within a 5 ms window, but the number of SS blocks within such a window depends on the numerology (e.g., up to 64 SS blocks with 240 kilohertz (kHz) subcarrier spacing). An example mapping for SS blocks within a time slot and within the 5 ms window is illustrated in FIGS. 4A and 4B.

NR Measurement Model

In RRC_CONNECTED, the UE measures at least one beam but potentially multiple beams of a cell, and the measurement results (e.g., power values) are averaged to derive the cell quality. In doing so, the UE is configured to consider a subset of the detected beams: the N best beams above an absolute threshold. Filtering takes place at two different levels, namely, at the physical layer to derive beam quality and then at the Radio Resource Control (RRC) level to derive cell quality from multiple beams. Cell quality from beam measurements is derived in the same way for the serving cell(s) and for the non-serving cell(s). Measurement reports may contain the measurement results of the X best beams if the UE is configured to do so by the gNB.

The corresponding high-level measurement model is illustrated in FIG. 5 and described below. Note that K beams correspond to the measurements on a NR-SS block or Channel State Information Reference Signal (CSI-RS) resources configured for Layer 3 (L3) mobility by gNB and detected by the UE at Layer 1 (L1) (i.e., the physical layer). Looking at FIG. 5:

A: Measurements (beam specific samples) internal to the physical layer.

Layer 1 filtering: Internal Layer 1 filtering of the inputs measured at point A. Exact filtering is implementation dependent. How the measurements are actually executed in the physical layer by an implementation (inputs A and Layer 1 filtering) is not constrained by the NR standard.

$A^1$: Measurements (i.e., beam specific measurements) reported by Layer 1 to Layer 3 after Layer 1 filtering.

Beam Consolidation/Selection: Beam specific measurements are consolidated to derive cell quality if N>1, else when N=1 the best beam measurement is selected to derive cell quality. The behavior of the beam consolidation/selection is standardized, and the configuration of this module is provided by RRC signaling. Reporting period at B equals one measurement period at $A^1$.

B: A measurement (i.e., cell quality) derived from beam-specific measurements reported to Layer 3 after beam consolidation/selection.

Layer 3 filtering for cell quality: Filtering performed on the measurements provided at point B. The behavior of the Layer 3 filters is standardized, and the configuration of the Layer 3 filters is provided by RRC signaling. Filtering reporting period at C equals one measurement period at B.

C: A measurement after processing in the Layer 3 filter. The reporting rate is identical to the reporting rate at point B. This measurement is used as input for one or more evaluations of reporting criteria.

Evaluation of reporting criteria: Checks whether actual measurement reporting is necessary at point D. The evaluation can be based on more than one flow of measurements at reference point C, e.g. to compare between different measurements. This is illustrated by input C and $C^1$. The UE evaluates the reporting criteria at least every time a new measurement result is reported at point C, $C^1$. The reporting criteria are standardized, and the configuration is provided by RRC signaling (UE measurements).

D: Measurement report information (message) sent on the radio interface.

L3 Beam filtering: Filtering performed on the measurements (i.e., beam specific measurements) provided at point $A^1$. The behavior of the beam filters is standardized, and the configuration of the beam filters is provided by RRC signaling. Filtering reporting period at E equals one measurement period at $A^1$.

E: A measurement (i.e., beam-specific measurement) after processing in the beam filter. The reporting rate is identical to the reporting rate at point $A^1$. This measurement is used as input for selecting the X measurements to be reported.

Beam Selection for beam reporting: Selects the X measurements from the measurements provided at point E. The behavior of the beam selection is standardized, and the configuration of this module is provided by RRC signaling.

F: Beam measurement information included in measurement report (sent) on the radio interface.

Layer 1 filtering introduces a certain level of measurement averaging. How and when the UE exactly performs the required measurements is implementation specific to the point that the output at B fulfils the performance requirements set in 3GPP Technical Specification (TS) 38.133. Layer 3 filtering for cell quality and related parameters used are specified in 3GPP TS 38.331 and does not introduce any delay in the sample availability between B and C. Measurement at point C, $C^1$ is the input used in the event evaluation. L3 beam filtering and related parameters used are specified in 3GPP TS 38.331 and do not introduce any delay in the sample availability between E and F.

Measurement reports are characterized by the following:

Measurement reports include the measurement identity of the associated measurement configuration that triggered the reporting.

Cell and beam measurement quantities to be included in measurement reports are configured by the network.

The number of non-serving cells to be reported can be limited through configuration by the network.

Cells belonging to a blacklist configured by the network are not used in event evaluation and reporting, and conversely when a whitelist is configured by the network, only the cells belonging to the whitelist are used in event evaluation and reporting.

Beam measurements to be included in measurement reports are configured by the network (beam identifier only, measurement result and beam identifier, or no beam reporting).

NR Cell Quality Derivation

In RAN2 #97-bis in Spokane, the following has been agreed concerning cell quality derivation:

1 Averaging is used to derive the cell quality from multiple beams (if number of beams is larger than 1). Details averaging are FFS Agreement 1 Serving cell quality is derived in the same way as neighbour cell quality (i.e. N best).

FFS whether a UE can be configured with a different values of N for the serving cell, and for specific neighbour cells.

Agreements

1: NR UE shall not consolidate NR-SS beam measurements and CSI-RS beam measurements together to derive a cell level measurement.

2: NR UE shall compare cell level measurements of different cells using the same type of RS(s). In another words, NR does not support comparison between NR-SS based measurement of a cell and CSI-RS based measurement of another cell.

In RAN2 #98 in Hangzhou, the following has been agreed concerning cell quality derivation:

Agreements for combining of beam measurements if N>1:

1 Averaging will be based on power values (i.e. not dBm values)

Working assumption: Average of up to best N of the detected beams above absolute threshold Agreements N (used in cell quality derivation) is configured per carrier.

FFS Whether a different value can be configured for NR-SS and CSI-RS and whether it can be configured per cell.

Then, in RAN2 #AdHoc in Qingdao:

Agreement

1 Cell quality should be derived by averaging the best beam with the up to N−1 best beams above absolute configured threshold.

And, finally in RAN #99 in Berlin, the following was agreed:

Agreements

1: Independent N and independent threshold should be configured per carrier frequency in the MeasObject for NR-SS based and CSI-RS based L3 mobility. (This agreement does not have any implication on the number of CSI-RS resources that can be configured per cell)

The abovementioned agreements were translated in the RRC specifications (3GPP TS 38.331) by defining cell quality derivation parameters per Reference Signal (RS) type (both the maximum number(s) of beams to be averaged and the absolute threshold(s) to define good beams) and within the MeasObjectNR Information Element (IE), as shown below:

MeasObjectNR

The IE MeasObjectNR specifies information applicable for SS/PBCH block(s) intra/inter-frequency measurements or CSI-RS intra/inter-frequency measurements.

MeasObjectNR Information Element

```
-- ASN1START
-- TAG-MEAS-OBJECT-NR-START
MeasObjectNR ::=                        SEQUENCE {
    ssbAbsoluteFreq                         GSCN-ValueNR,
    --FFS whether reference frequency represents pointA
    refFreqCSI-RS                           ARFCN-ValueNR              OPTIONAL,
    --RS configuration (e.g. SMTC window, CSI-RS resource, etc.)
    referenceSignalConfig                   ReferenceSignalConfig,
    --Consolidation of L1 measurements per RS index
    absThreshSS-BlocksConsolidation         ThresholdNR                OPTIONAL,   -- Need R
    absThreshCSI-RS-Consolidation           ThresholdNR                OPTIONAL,   -- Need R
    --Config for cell measurement derivation
    nrofSS-BlocksToAverage          INTEGER (2..maxNrofSS-BlocksToAverage)     OPTIONAL, -- Need R
    nrofCSI-RS-ResourcesToAverage   INTEGER (2..maxNrofCSI-RS-ResourcesToAverage) OPTIONAL,   -- Need R
    -- Filter coefficients applicable to this measurement object
    quantityConfigIndex                     INTEGER (1.. maxNrofQuantityConfig),
    --Frequency-specific offsets
    offsetFreq                              Q-OffsetRangeList,
    -- Cell list
    cellsToRemoveList                       PCI-List                   OPTIONAL,   -- Need M
    cellsToAddModList                       CellsToAddModList          OPTIONAL,   -- Need M
    -- Black list
    blackCellsToRemoveList                  PCI-RangeIndexList         OPTIONAL,   -- Need M
    blackCellsToAddModList                  BlackCellsToAddModList     OPTIONAL,   -- Need M
    -- White list
    whiteCellsToRemoveList                  PCI-RangeIndexList         OPTIONAL,   -- Need M
    whiteCellsToAddModList                  WhiteCellsToAddModList     OPTIONAL,   -- Need M
    -- FFS: Where to include L1 parameters for RSSI measurements (SS-RSSI-MeasurementConfig in L1
    table)
}
ReferenceSignalConfig ::=               SEQUENCE {
    -- SSB configuration for mobility (nominal SSBs, timing configuration)
    ssb-ConfigMobility                      SSB-ConfigMobility         OPTIONAL,   -- Need M
    -- CSI-RS resources to be used for CSI-RS based RRM measurements
    csi-rs-ResourceConfigMobility           CSI-RS-ResourceConfigMobility   OPTIONAL -- Need R
}
-- A measurement timing configuration
SSB-ConfigMobility ::= SEQUENCE {
    subcarrierSpacingSSB                    SubcarrierSpacingSSB,
    -- The set of SS blocks to be measured within the SMTC measurement duration.
    -- Corresponds to L1 parameter 'SSB-measured' (see FFS_Spec, section FFS_Section)
    -- When the field is absent the UE measures on all SS-blocks
    -- FFS_CHECK: Is this IE placed correctly.
    ssb-ToMeasure                           SetupRelease {
        CHOICE
            -- bitmap for sub 3 GHz
            shortBitmap                         BIT STRING (SIZEK (4)),
            -- bitmap for 3-6 GHz
            mediumBitmap                        BIT STRING (SIZE (8)),
            -- bitmap for above 6 GHz
            longBitmap                          BIT STRING (SIZE (64))
        }
    }                                                                  OPTIONAL,   -- Need M
    -- Indicates whether the UE can utilize serving cell timing to derive the index of SS block
    transmitted by neighbour cell:
    useServingCellTimingForSync             BOOLEAN,
```

```
       -- Primary measurement timing configuration. Applicable for intra- and inter-frequency
measurements.
       smtc1                                         SEQUENCE {
           -- Periodicity and offset of the measurement window in which to receive SS/PBCH blocks.
           -- Periodicity and offset are given in number of subframes.
           -- FFS_FIXME: This does not match the L1 parameter table! They seem to intend an index to a
hidden table in L1 specs.
           -- (see 38.213, section REF):
           periodicityAndOffset                     CHOICE {
               sf5                                  INTEGER (0..4),
               sf10                                 INTEGER (0..9),
               sf20                                 INTEGER (0..19),
               sf40                                 INTEGER (0..39),
               sf80                                 INTEGER (0..79),
               sf160                                INTEGER (0..159)
           },
           -- Duration of the measurement window in which to receive SS/PBCH blocks. It is given in
number of subframes
           -- (see 38.213, section 4.1)
           duration                                 ENUMERATED { sf1, sf2, sf3, sf4, sf5 }
       },
       -- Secondary measurement timing confguration for explicitly signalled PCIs. It uses the offset
and duration from smtc1.
       -- It is supported only for intra-frequency measurements in RRC CONNECTED.
       smtc2                                        SEQUENCE {
           -- PCIs that are known to follow this SMTC.
           pci-List           SEQUENCE (SIZE (1..maxNrofPCIsPerSMTC)) OF PhysCellId   OPTIONAL,      -- Need
M
           -- Periodicity for the given PCIs. Timing offset and Duration as provided in smtc1.
           periodicity                              ENUMERATED {sf5, sf10, sf20, sf40, sf80, sf160,
spare2, spare1}                                                      OPTIONAL -- Cond
IntraFreqConnected
}
CSI-RS-ResourceConfigMobility ::=            SEQUENCE {
       -- MO specific values
           isServingCellMO                          BOOLEAN,
       -- Subcarrier spacing of CSI-RS.
       -- Supported values are 15, 30 or 60 kHz (<6GHz), 60 or 120 kHz (>6GHz).
       -- Corresponds to L1 parameter 'Numerology' (see 38.211, section FFS_Section)
       subcarrierSpacingCSI-RS                      SubcarrierSpacingCSI-RS,
       -- List of cells
       csi-RS-CellList-Mobility         SEQUENCE (SIZE (1..maxNrofCSI-RS-CellsRRM)) OF CSI-RS-CellMobility
}
CSI-RS-CellMobility ::=              SEQUENCE {
       cellId                                       PhysCellId,
       csi-rs-MeasurementBW                         SEQUENCE {
           -- Allowed size of the measurement BW in PRBs
           -- Corresponds to L1 parameter 'CSI-RS-measurementBW-size' (see FFS_Spec, section
FFS_Section)
           nrofPRBs             ENUMERATED { size24, size48, size96, size192, size264},
           -- Starting PRB index of the measurement bandwidth
           -- Corresponds to L1 parameter 'CSI-RS-measurement-BW-start' (see FFS_Spec, section
FFS_Section)
           -- FFS_Value: Upper edge of value range unclear in RANL1
           startPRB              INTEGER(0..251)
       },
       -- Frequency domain density for the 1-port CSI-RS for L3 mobility
       -- Corresponds to L1 parameter 'Density' (see FFS_Spec, section FFS_Section)
       density                                      ENUMERATED {d1,d3}  OPTIONAL,
       -- List of resources
       csi-rs-ResourceList-Mobility         SEQUENCE (SIZE (1..maxNrofCSI-RS-ResourcesRRM)) OF CSI-RS-
Resource-Mobility
}
CSI-RS-Resource-Mobility ::=                 SEQUENCE {
       csi-rs-ResourceId-RRM                        CSI-RS-ResourceId-RRM,
       -- FFS_CHECK whether the following fields are supposed to be per resource (here) or in the
resource config (above)
       -- Contains periodicity and slot offset for periodic/semi-persistent CSI-RS (see 38.211,
section x.xx.x.x)FFS_Ref
       slotConfig                                   CHOICE {
           ms5                                      INTEGER (0..79),
           ms10                                     INTEGER (0..159),
           ms20                                     INTEGER (0..319),
           ms40                                     INTEGER (0..639)
       },
```

```
    -- Each CSI-RS resource may be associated with one SSB. If such SSB is indicated, the NW also
indicates whether the UE may assume
        -- quasi-colocation of this SSB with this CSI-RS reosurce.
        -- Corresponds to L1 parameter 'Associated-SSB' (see FFS_Spec, section FFS_Section)
        -- FFS: What does the UE do if it there is no such SSB-Index?
        associatedSSB                           SEQUENCE {
            -- FFS_Value: Check the value range
            ssb-Index                           SSB-Index,
        -- The CSI-RS resource is either QCL'ed not QCL'ed with the associated SSB in spatial
parameters
            -- Corresponds to L1 parameter 'QCLed-SSB' (see FFS_Spec, section FFS_Section)
            isQuasiColocated                    BOOLEAN
        }                                       OPTIONAL,
        -- Resource Element mapping pattern for CSI-RS (see 38.211, section x.x.x.x) FFS_Ref
        resourceElementMappingPattern           ENUMERATED {ffsTypeAndValue},
        -- Sequence generation parameter for CSI-RS (see 38.211, section x.x.x.x) FFS_Ref
        sequenceGenerationConfig                INTEGER (0..1023),
        ...
}
CSI-RS-ResourceId-RRM ::=                       INTEGER (0..maxNrofCSI-RS-ResourcesRRM-1)
Q-OffsetRangeList ::=                           SEQUENCE {
    rsrpOffsetSSB                               Q-OffsetRange              DEFAULT dB0,
    rsrqOffsetSSB                               Q-OffsetRange              DEFAULT dB0,
    sinrOffsetSSB                               Q-OffsetRange              DEFAULT dB0,
    rsrpOffsetCSI-RS                            Q-OffsetRange              DEFAULT dB0,
    rsrqOffsetCSI-RS                            Q-OffsetRange              DEFAULT dB0,
    sinrOffsetCSI-RS                            Q-OffsetRange              DEFAULT dB0
}
ThresholdNR ::=                                 SEQUENCE{
    thresholdRSRP                               RSRP-Range                 OPTIONAL,
    thresholdRSRQ                               RSRQ-Range                 OPTIONAL,
    thresholdSINR                               SINR-Range                 OPTIONAL
}
CellsToAddModList ::=                           SEQUENCE (SIZE (1..maxNrofCellMeas)) OF CellsToAddMod
CellsToAddMod ::=                               SEQUENCE {
    physCellId                                  PhysCellId,
    cellIndividualOffset                        Q-OffsetRangeList
}
BlackCellsToAddModList ::=                      SEQUENCE (SIZE (1..maxNrofPCI-Ranges)) OF
BlackCellsToAddMod
BlackCellsToAddMod ::=                          SEQUENCE {
    pci-RangeIndex                              PCI-RangeIndex,
    pci-Range                                   PCI-Range
}
WhiteCellsToAddModList ::=                      SEQUENCE (SIZE (1..maxNrofPCI-Ranges)) OF
WhiteCellsToAddMod
WhiteCellsToAddMod ::=                          SEQUENCE {
    pci-RangeIndex                              PCI-RangeIndex,
    physCellIdRange                             PhysCellIdRange
}
-- TAG-MEAS-OBJECT-NR-STOP
-- ASN1STOP
-- ASN1START
-- TAG-MEAS-OBJECT-NR-START
MeasObjectNR ::=                                SEQUENCE {
    ssbAbsoluteFreq                             GSCN-ValueNR,
    --FFS whether reference frequency represents pointA
    refFreqCSI-RS                               ARFCN-ValueNR              OPTIONAL,
    --RS configuration (e.g. SMTC window, CSI-RS resource, etc.)
    referenceSignalConfig                       ReferenceSignalConfig,
    --Consolidation of L1 measurements per RS index
    absThreshSS-BlocksConsolidation             ThresholdNR                OPTIONAL,     -- Need R
    absThreshCSI-RS-Consolidation               ThresholdNR                OPTIONAL,     -- Need R
    --Config for cell measurement derivation
    nrofSS-BlocksToAverage          INTEGER (2..maxNrofSS-BlocksToAverage)       OPTIONAL, -- Need R
    nrofCSI-RS-ResourcesToAverage   INTEGER (2..maxNrofCSI-RS-ResourcesToAverage) OPTIONAL, -- Need
R
    -- Filter coefficients applicable to this measurement object
    quantityConfigIndex                         INTEGER (1.. maxNrofQuantityConfig),
    --Frequency-specific offsets
    offsetFreq                                  Q-OffsetRangeList,
    -- Cell list
    cellsToRemoveList                           PCI-List                   OPTIONAL,     -- Need M
    cellsToAddModList                           CellsToAddModList          OPTIONAL,     -- Need M
    -- Black list
    blackCellsToRemoveList                      PCI-RangeIndexList         OPTIONAL,     -- Need M
    blackCellsToAddModList                      BlackCellsToAddModList     OPTIONAL,     -- Need M
```

```
    -- White list
        whiteCellsToRemoveList                      PCI-RangeIndexList              OPTIONAL,      -- Need M
        whiteCellsToAddModList                      WhiteCellsToAddModList          OPTIONAL       -- Need M
-- FFS: Where to include L1 parameters for RSSI measurements (SS-RSSI-MeasurementConfig in L1
table)
}
ReferenceSignalConfig ::=                   SEQUENCE {
    -- SSB configuration for mobility (nominal SSBs, timing configuration)
    ssb-ConfigMobility                          SSB-ConfigMobility              OPTIONAL,      -- Need M
    -- CSI-RS resources to be used for CSI-RS based RRM measurements
    csi-rs-ResourceConfigMobility               CSI-RS-ResourceConfigMobility   OPTIONAL -- Need R
}
-- A measurement timing configuration
SSB-ConfigMobility ::= SEQUENCE {
        subcarrierSpacingSSB                    SubcarrierSpacingSSB,
        -- The set of SS blocks to be measured within the SMTC measurement duration.
        -- Corresponds to L1 parameter 'SSB-measured' (see FFS_Spec, section FFS_Section)
        -- When the field is absent the UE measures on all SS-blocks
        -- FFS_CHECK: Is this IE placed correctly.
        ssb-ToMeasure                           SetupRelease {
            CHOICE {
                -- bitmap for sub 3 GHz
                shortBitmap                     BIT STRING (SIZEK (4)),
                -- bitmap for 3-6 GHz
                mediumBitmap                    BIT STRING (SIZE (8)),
                -- bitmap for above 6 GHz
                longBitmap                      BIT STRING (SIZE (64))
            }
        }                                                                       OPTIONAL,      -- Need M
        -- Indicates whether the UE can utilize serving cell timing to derive the index of SS block
transmitted by neighbour cell:
        useServingCellTimingForSyne             BOOLEAN,
        -- Primary measurement timing configuration. Applicable for intra- and inter-frequency
measurements.
        smtcl                                   SEQUENCE {
            -- Periodicity and offset of the measurement window in which to receive SS/PBCH blocks.
            -- Periodicity and offset are given in number of subframes.
            -- FFS_FIXME: This does not match the L1 parameter table! They seem to intend an index to a
hidden table in L1 specs.
            -- (see 38.213, section REF):
            periodicityAndOffset                CHOICE {
                sf5                                 INTEGER (0..4),
                sf10                                INTEGER (0..9),
                sf20                                INTEGER (0..19),
                sf40                                INTEGER (0..39),
                sf80                                INTEGER (0..79),
                sf160                               INTEGER (0..159)
            },
            -- Duration of the measurement window in which to receive SS/PBCH blocks. It is given in
number of subframes
            -- (see 38.213, section 4.1)
            duration                            ENUMERATED { sf1, sf2, sf3, sf4, sf5 }
        },
        -- Secondary measurement timing confguration for explicitly signalled PCIs. It uses the offset
and duration from smtcl.
        -- It is supported only for intra-frequency measurements in RRC CONNECTED.
        smtc2                                   SEQUENCE {
            -- PCIs that are known to follow this SMTC.
            pci-List        SEQUENCE (SIZE (1..maxNrofPCIsPerSMTC)) OF PhysCellId    OPTIONAL,    -- Need
M
            -- Periodicity for the given PCIs. Timing offset and Duration as provided in smtcl.
            periodicity                         ENUMERATED {sf5, sf10, sf20, sf40, sf80, sf160,
spare2, spare1}                                                                 OPTIONAL -- Cond
IntraFreqConnected
}
CSI-RS-ResourceConfigMobility ::=           SEQUENCE {
    -- MO specific values
        isServingCellMO                         BOOLEAN,
    -- Subcarrier spacing of CSI-RS.
    -- Supported values are 15, 30 or 60 kHz (<6GHz), 60 or 120 kHz (>6GHz).
    -- Corresponds to L1 parameter 'Numerology' (see 38.211, section FFS_Section)
    subcarrierSpacingCSI-RS                     SubcarrierSpacingCSI-RS,
    -- List of cells
    csi-RS-CellList-Mobility    SEQUENCE (SIZE (1..maxNrofCSI-RS-CellsRRM)) OF CSI-RS-CellMobility
}
```

```
CSI-RS-CellMobility ::=                 SEQUENCE {
    cellId                              PhysCellId,
    csi-rs-MeasurementBW                SEQUENCE {
    -- Allowed size of the measurement BW in PRBs
    -- Corresponds to L1 parameter 'CSI-RS-measurementBW-size' (see FFS_Spec, section
FFS_Section)
    nrofPRBs                            ENUMERATED { size24, size48, size96, size92, size264},
    -- Starting PRB index of the measurement bandwidth
    -- Corresponds to L1 parameter 'CSI-RS-measurement-BW-start' (see FFS_Spec, section
FFS_Section)
    -- FFS_Value: Upper edge of value range unclear in RANL1
    startPRB                            INTEGER(0..251)
},
    -- Frequency domain density for the 1-port CSI-RS for L3 mobility
    -- Corresponds to L1 parameter 'Density' (see FFS_Spec, section FFS_Section)
    density                             ENUMERATED {d1,d3}  OPTIONAL,
    -- List of resources
    csi-rs-ResourceList-Mobility        SEQUENCE (SIZE (1..maxNrofCSI-RS-ResourcesRRM)) OF CSI-RS-
Resource-Mobility
}
CSI-RS-Resource-Mobility ::=            SEQUENCE {
    csi-rs-ResourceId-RRM               CSI-RS-ResourceId-RRM,
    -- FFS_CHECK whether the following fields are supposed to be per resource (here) or in the
resource config (above)
    -- Contains periodicity and slot offset for periodic/semi-persistent CSI-RS (see 38.211,
section x.x.x.x.x)FFS_Ref
    slotConfig                          CHOICE {
        ms5                             INTEGER (0..79),
        ms10                            INTEGER (0..159),
        ms20                            INTEGER (0..319),
        ms40                            INTEGER (0..639)
    },
    -- Each CSI-RS resource may be associated with one SSB. If such SSB is indicated, the NW also
indicates whether the UE may assume
    -- quasi-colocation of this SSB with this CSI-RS reosurce.
    -- Corresponds to L1 parameter 'Associated--SSB' (see FFS_Spec, section FFS_Section)
    -- FFS: What does the UE do if it there is no such SSB-Index
    associatedSSB                       SEQUENCE {
        -- FFS_Value: Check the value range
        ssb-Index                       SSB-Index,
        -- The CSI-RS resource is either QCL'ed not QCL'ed with the associated SSB in spatial
parameters
        -- Corresponds to L1 parameter 'QCLed-SSB' (see FFS_Spec, section FFS_Section)
        isQuasiColocated                BOOLEAN
    }                   OPTIONAL,
    -- Resource Element mapping pattern for CSI-RS (see 38.211, section x.x.x.x) FFS_Ref
    resourceElementMappingPattern       ENUMERATED {ffsTypeAndValue},
    -- Sequence generation parameter for CSI-RS (see 38.211, section x.x.x.x) FFS_Ref
    sequenceGenerationConfig            INTEGER (0..1023),
    ...
}
CSI-RS-ResourceId-RRM ::=               INTEGER (0..maxNrofCSI-RS-ResourcesRRM-1)
Q-OffsetRangeList ::=                   SEQUENCE {
    rsrpOffsetSSB                       Q-OffsetRange               DEFAULT dB0,
    rsrqOffsetSSB                       Q-OffsetRange               DEFAULT dB0,
    sinrOffsetSSB                       Q-OffsetRange               DEFAULT dB0,
    rsrpOffsetCSI-RS                    Q-OffsetRange               DEFAULT dB0,
    rsrqOffsetCSI-RS                    Q-OffsetRange               DEFAULT dB0,
    sinrOffsetCSI-RS                    Q-OffsetRange               DEFAULT dB0
}
ThresholdNR ::=                         SEQUENCE {
    thresholdRSRP                       RSRP-Range                  OPTIONAL,
    thresholdRSRQ                       RSRQ-Range                  OPTIONAL,
    thresholdSINR                       SINR-Range                  OPTIONAL
}
CellsToAddModList ::=                   SEQUENCE (SIZE (1..maxNrofCellMeas)) OF CellsToAddMod
CellsToAddMod ::=                       SEQUENCE {
    physCellId                          PhysCellId,
    cellIndividualOffset                Q-OffsetRangeList
}
BlackCellsToAddModList ::               SEQUENCE (SIZE (1..maxNrofPCI-Ranges)) OF
BlackCellsToAddMod
BlackCellsToAddMod ::=                  SEQUENCE {
    pci-RangeIndex                      PCI-RangeIndex,
    pci-Range                           PCI-Range
}
```

-continued

```
WhiteCellsToAddModList ::      SEQUENCE (SIZE (1..maxNrofPCI-Ranges)) OF
WhiteCellsToAddMod
WhiteCellsToAddMod ::=         SEQUENCE {
    pci-RangeIndex                 PCI-RangeIndex,
    physCellIdRange                PhysCellIdRange
}
-- TAG-MEAS-OBJECT-NR-STOP
-- ASN1STOP
```

It is worth mentioning that the sections above have focused on two parameters per RS type for Cell Quality Derivation (CQD), namely, max number of beams to be averaged and threshold for good beams. However, other parameters within the MeasObjectNR in addition to the previous ones are also need for CQD or are at least relevant for event triggering, such as:
  Cell lists (black cells, white cells);
  Reference signal configuration including:
    SS/PBCH Block Measurement Time Configuration (SMTC) configuration(s);
    Nominal SSBs to measure;
    SSB and/or CSI-RS subcarrier spacing(s);
  Filtering configurations;
  Frequency/cell specific offsets.

SUMMARY

Systems and methods are disclosed herein for enabling a User Equipment (UE) to perform cell quality derivation in a wireless communication network utilizing parameters from an appropriate measurement object. In some embodiments, a method of operation of a UE to perform cell quality derivation in a wireless communication network comprises obtaining parameters to perform cell quality derivation for a serving cell of the UE from a measurement object that contains frequency information that matches frequency information provided in a serving cell configuration of the serving cell. The method further comprises performing cell quality derivation for the serving cell based on the obtained parameters. In some embodiments, the UE is configured, by the wireless communication network, with one or more measurement objects, and the measurement object from which the parameters to perform cell quality derivation for the serving cell are obtained by the UE is a particular measurement object from among the one or more measurement objects. In this manner, the UE is enabled to perform cell quality derivation using parameters from an appropriate measurement object.

In some embodiments, the frequency information is information that indicates a frequency location of Synchronization Signal/Physical Broadcast Channel Block (SSB) to be measured or to be used as a synchronization source for Channel State Information Reference Signal (CSI-RS) resources. In some other embodiments, the frequency information is information that indicates a frequency location of a CSI-RS to be measured or a reference frequency that serves to locate where the CSI-RS is located in a Physical Resource Block (PRB) grid. In some other embodiments, the frequency information contained in the measurement object is an absolute frequency of SSB to be used for measurements made in accordance with the measurement object, and the frequency information provided in the serving cell configuration of the serving cell is an absolute frequency of SSB to be used for the serving cell.

In some embodiments, the UE is configured, by the wireless communication network, with one or more measurement objects. Each measurement object of the one or more measurement objects comprises parameters that enable the UE to perform cell quality derivation. Further, the UE is configured with measurement events each having a corresponding measurement identifier, where each measurement identifier links one of the one or more measurement objects to a respective reporting configuration. The measurement object from which the parameters perform cell quality derivation for the serving cell is obtained by the UE is a particular measurement object from among the one or more measurement objects.

Embodiments of a UE for performing cell quality derivation in a wireless communication network are also disclosed. In some embodiments, a UE for performing cell quality derivation in a wireless communication network is adapted to obtain parameters to perform cell quality derivation for a serving cell of the UE from a measurement object that contains frequency information that matches frequency information provided in a serving cell configuration of the serving cell. The UE is further adapted to perform cell quality derivation for the serving cell based on the obtained parameters.

In some embodiments, a UE for performing cell quality derivation in a wireless communication network comprises an interface comprising radio front end circuitry and processing circuitry associated with the interface. The processing circuitry is configured to cause the UE to obtain parameters to perform cell quality derivation for a serving cell of the UE from a measurement object that contains frequency information that matches frequency information provided in a serving cell configuration of the serving cell and perform cell quality derivation for the serving cell based on the obtained parameters.

In some embodiments, the UE is configured, by the wireless communication network, with one or more measurement objects, and the measurement object from which the parameters perform cell quality derivation for the serving cell are obtained by the UE is a particular measurement object from among the one or more measurement objects.

In some embodiments, the frequency information is information that indicates a frequency location of SSB to be measured or to be used as a synchronization source for CSI-RS resources. In some other embodiments, the frequency information is information that indicates a frequency location of a CSI-RS to be measured or a reference frequency that serves to locate where the CSI-RS is located in a PRB grid. In some other embodiments, the frequency information contained in the measurement object is an absolute frequency of SSB to be used for measurements made in accordance with the measurement object, and the frequency information provided in the serving cell configuration of the serving cell is an absolute frequency of SSB to be used for the serving cell.

In some embodiments, the UE is configured, by the wireless communication network, with one or more measurement objects, wherein each measurement object of the one or more measurement objects comprises parameters that enable the UE to perform cell quality derivation. Further, the UE is configured with measurement events each having a corresponding measurement identifier, where each measurement identifier links one of the one or more measurement objects to a respective reporting configuration. The measurement object from which the parameters perform cell quality derivation for the serving cell is obtained by the UE is a particular measurement object from among the one or more measurement objects.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 2A and 2B illustrate two examples of beam sweeping;

FIG. 13 illustrates methods implemented in a communication system including a host computer, a base station, and a UE in accordance with some embodiments;

FIG. 14 illustrates methods implemented in a communication system including a host computer, a base station, and a UE in accordance with some embodiments;

DETAILED DESCRIPTION

Figure 1:
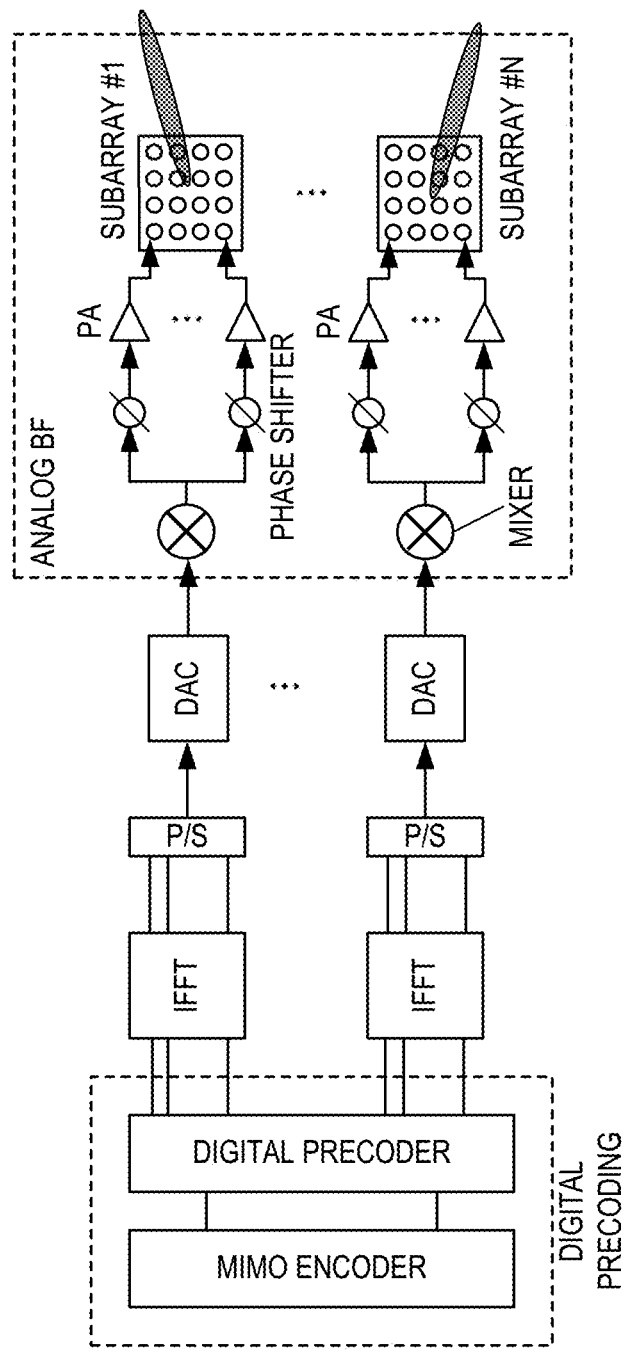
FIG. 1 illustrates one example of hybrid beamforming.
Figure 3:
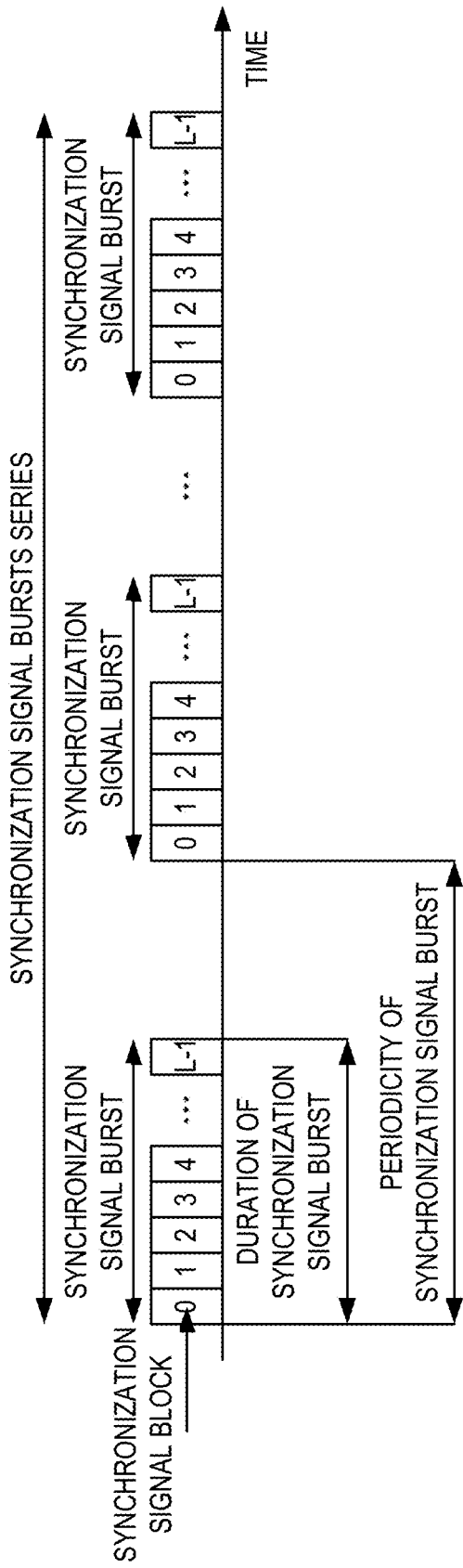
FIG. 3 illustrates an example configuration of Synchronization Signal (SS) blocks, SS bursts, and SS burst sets or series.
Figure 4A:
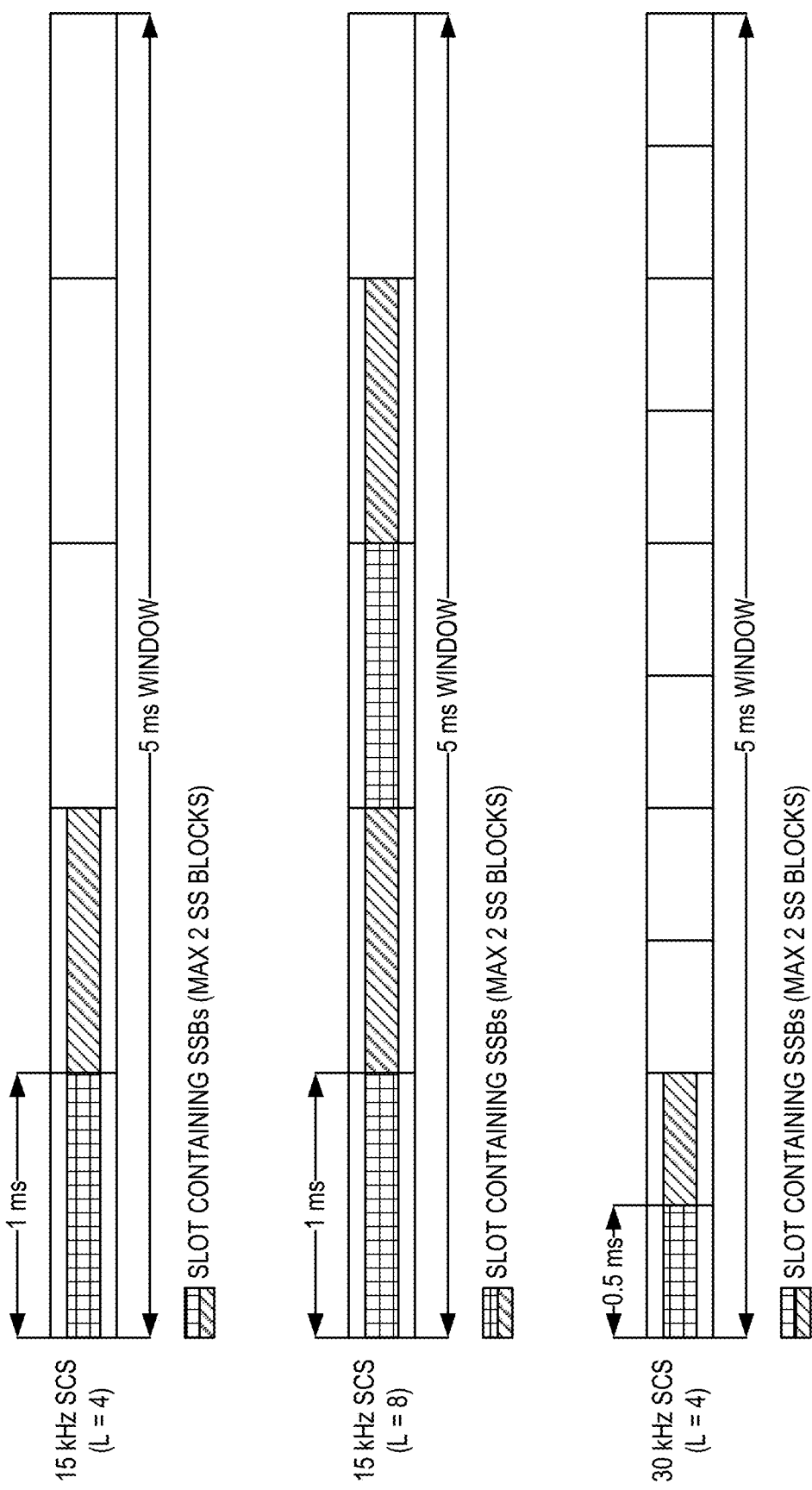
FIGS. 4A and 4B illustrate an example mapping for SS blocks within a time slot and within the 5 millisecond (ms) window.
Figure 4B:
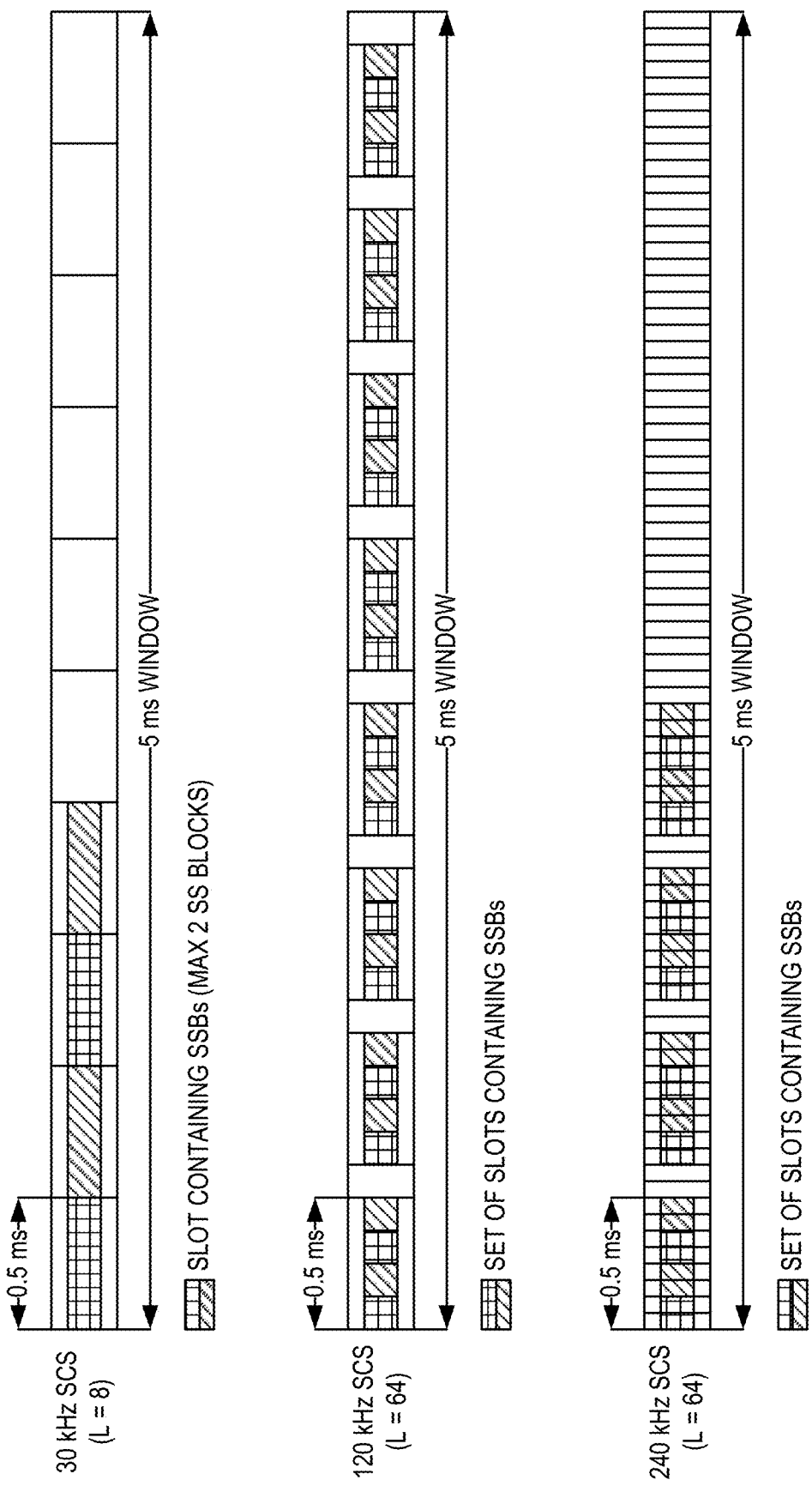
Figure 5:
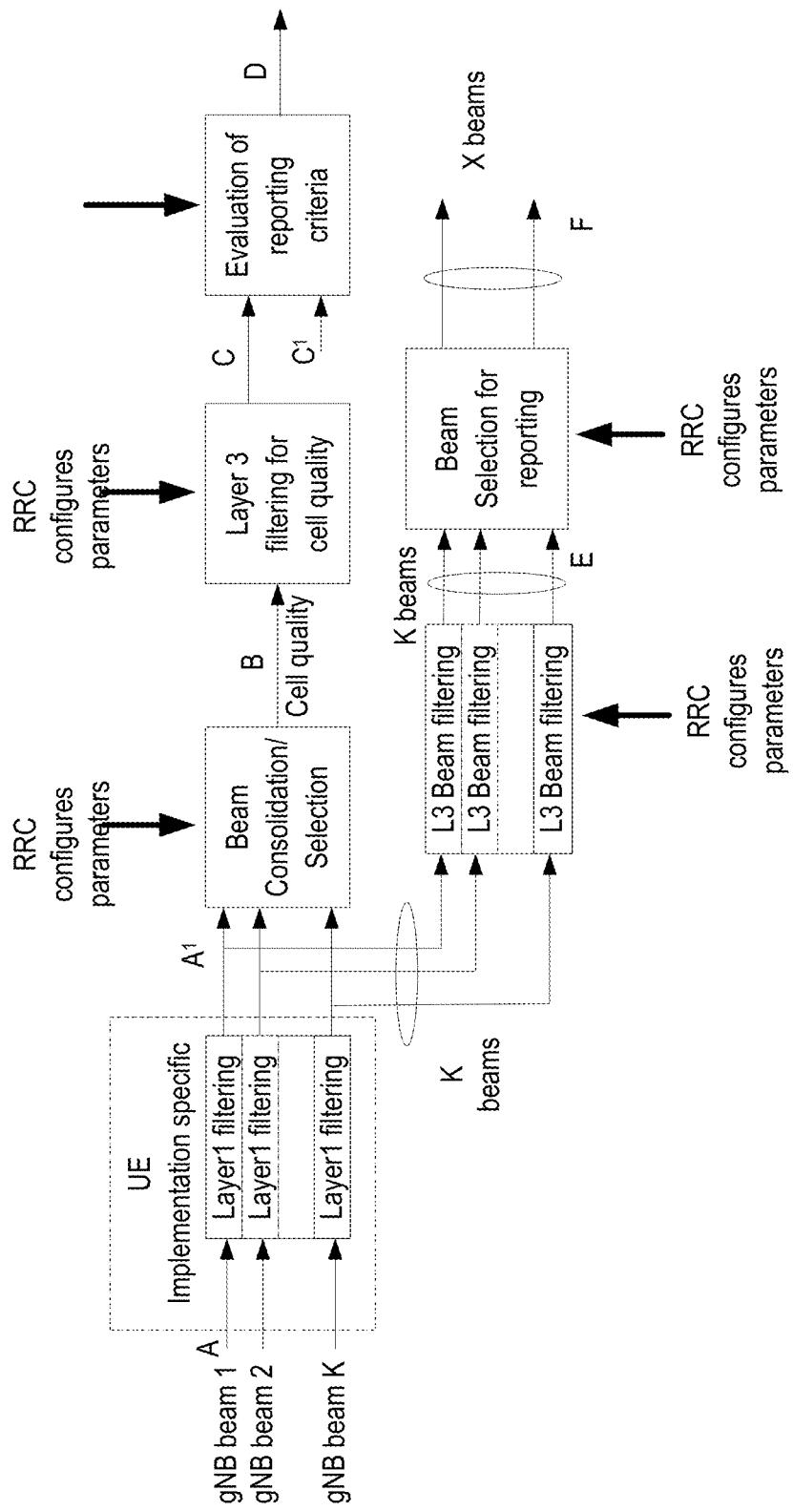
FIG. 5 illustrates a measurement model for Third Generation Partnership Project (3GPP) New Radio (NR)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The term "signaling" used herein may comprise any of: high-layer signaling (e.g., via Radio Resource Control (RRC) or the like), lower-layer signaling (e.g., via a physical control channel or a broadcast channel), or a combination thereof. The signaling may be implicit or explicit. The signaling may further be unicast, multicast, or broadcast. The signaling may also be directly to another node or via a third node.

In the context of the following embodiments, the term "parameters to perform Cell Quality Derivation (CQD)" will be constantly used. Although we have used this term, the parameters are not only about that and, in a more general sense, they could be said to be influencing event triggering or even influencing information to be reported. The common aspect is that they are within the measObjectNR and there is an ambiguity to which measObjectNR the User Equipment (UE) selects to obtain these parameters for a given measId. These can be considered any of the following parameters or a combination of them:

Cell lists (black cells, white cells);

Reference signal configuration including:

SS/PBCH Block Measurement Time Configuration (SMTC) configuration(s);

Nominal Synchronization Signal (SS)/Physical Broadcast Channel (PBCH) Blocks (SSBs) to measure;

SSB and/or Channel State Information Reference Signal (CSI-RS) subcarrier spacing(s);

Filtering configurations;

Frequency/cell specific offsets;

Threshold defining good beams to be reported (covered explicitly in 'Embodiments related to ambiguity solving in beam reporting' sub-section below);

Threshold defining good beams to be averaged with the best beam.

Before describing embodiments of the present disclosure, a description of certain currently existing challenges is beneficial. As discussed above, in Third Generation Partnership Project (3GPP) New Radio (NR), parameters enabling the UE to compute CQD are provided as part of the measObject. However, the UE is typically configured by the network with many measurement objects, and the current procedures in the 3GPP NR RRC specifications are ambiguous in some scenarios so that it is not clear to the UE which measObject to use to perform CQD. Below, these ambiguities are analyzed for serving cell(s) and neighbor cell(s).

The UE knows what kind of serving cell measurement to perform as described in section 5.5.3.1 of Technical Specification (TS) 38.331:

The UE shall:

---

1> whenever the UE has a measConfig, perform RSRP and RSRQ measurements for each serving cell as follows:
    2> if at least one measId included in the measIdList within VarMeasConfig contains an rsType set to ssb:
        3> if at least one measId included in the measIdList within VarMeasConfig contains a reportQuantityRsIndexes:
            4> derive layer 3 filtered RSRP and RSRQ per beam for the serving cell based on SS/PBCH block, as described in 5.5.3.3a;
        3> derive serving cell measurement results based on SS/PBCH block, as described in 5.5.3.3;
    2> if at least one measId included in the measIdList within VarMeasConfig contains an rsType set to csi-rs:
        3> if at least one measId included in the measIdList within VarMeasConfig contains a reportQuantityRsIndexes:
            4> derive layer 3 filtered RSRP and RSRQ per beam for the serving cell based on CSI-RS, as described in 5.5.3.3a;
        3> derive serving cell measurement results based on CSI-RS, as described in 5.5.3.3;
1> if at least one measId included in the measIdList within VarMeasConfig contains SINR as trigger quantity and/or reporting quantity:
    2> if the associated reportConfig contains rsType set to ssb:
        3> if the measId contains a reportQuantityRsIndexes:
            4> derive layer 3 filtered SINR per beam for the serving cell based on SS/PBCH block, as described in 5.5.3.3a;
        3> derive serving cell SINR based on SS/PBCH block, as described in 5.5.3.3;
    2> if the associated reportConfig contains rsType set to csi-rs:
        3> if the measId contains a reportQuantityRsIndexes:
            4> derive layer 3 filtered SINR per beam for the serving cell based on CSI-RS, as described in 5.5.3.3a;
        3> derive serving cell SINR based on CSI-RS, as described in 5.5.3.3;

---

Notice that in the abovementioned part of the text, there is nothing describing which measObjectNR the UE should select to obtain the parameters to perform CQD (out of the measObjectNR(s) the UE has been configured with). Then, in section 5.5.3.3 of TS 38.331, the following details on how the CQD shall be performed are provided:

The network may configure the UE to perform RSRP, RSRQ and SINR measurement results per cell associated to NR carrier frequencies based on parameters configured in the measObject (e.g. maximum number of beams to be averaged and beam consolidation thresholds) and in the reportConfig (rsType to be measured, SS/PBCH block or CSI-RS).

The UE shall:

---

1> for each cell measurement quantity to be derived based on SS/PBCH block:
    2> if nrofSS-BlocksToAverage in the associated measObject is not configured; or
    2> if absThreshSS-BlocksConsolidation in the associated measObject is not configured; or
        if the highest beam measurement quantity value is below absThreshSS-BlocksConsolidation:
        3> derive each cell measurement quantity based on SS/PBCH block as the highest beam measurement quantity value, where each beam measurement quantity is described in TS 38.215 [9];
    2> else:
        3> derive each cell measurement quantity based on SS/PBCH block as the linear average of the power values of the highest beam measurement quantity values above absThreshSS-BlocksConsolidation where the total number of averaged beams shall not exceed nrofSS-BlocksToAverage;
1> for each cell measurement quantity to be derived based on CSI-RS:
    2> consider a CSI-RS resource on the associated frequency to be applicable for deriving RSRP when the concerned CSI-RS resource is included in the csi-rs-ResourceConfigMobility with the corresponding cellId and CSI-RS-ResourceId-RRM within the VarMeasConfig for this measId;
    2> if nrofCSI-RS-ResourcesToAverage in the associated measObject is not configured; or
    2> if absThreshCSI-RS-Consolidation in the associated measObject is not configured; or
    2> if the highest beam measurement quantity value is below absThreshCSI-RS-Consolidation:
        3> derive each cell measurement quantity based on CSI-RS as the highest beam measurement quantity value, where each beam measurement quantity is described in TS 38.215 [9];
    2> else:
        3> derive each cell measurement quantity based on CSI-RS as the linear average of the power values of the highest beam measurement quantity values above absThreshCSI-RS-Consolidation where the total number of averaged beams shall not exceed nroCSI-RS-ResourcesToAverage;

---

In the text above, one can see some attempt to describe which measurement object the UE shall select to then obtain the correct parameters to perform CQD. However, although the text says parameters configured in the measObject, it is still not clear which measObject, as reproduced once more below:

"cell associated to NR carrier frequencies based on parameters configured in the measObject (e.g. maximum number of beams to be averaged and beam consolidation thresholds) and in the reportConfig (rsType to be measured, SS/PBCH block or CSI-RS)."

And in the procedure, the phrase "in the associated measObject" appears, although, once more it is not clear what this association could really mean, for example as reproduced below:

```
2> if absThreshSS-BlocksConsolidation in the associated measObject is not configured; or
2> if the highest beam measurement quantity value is below absThreshSS-BlocksConsolidation:
   3> derive each cell measurement quantity based on SS/PBCH block as the highest beam measurement
      quantity value, where each beam measurement quantity is described in TS 38.215 [9];
```

One could try to argue that it is not extremely difficult to derive or guess that the association as the measObjectNR to use the one associated to the carrier that cell belongs to. In Long Term Evolution (LTE), that would be true, as the measObject has an Absolute Radio Frequency Channel Number (ARFCN) parameter called carrierFreq. Hence, there is a one to one relation between measurement object and carrier frequency. Hence, to perform CQD of a cell transmitted in a given carrier frequency in LTE, the UE shall obtain parameters at the measurement object associated to that carrier frequency. However, in NR, there are two primary issues:

1. The relation between measurement object and carrier is much more blurred compared to LTE. In NR, the UE does not obtain, in the measObject, details about the carrier frequency in which it has to measure. Instead, the UE gets, in the measurement object, the frequency location of reference signal(s), SS/PBCH block, and possibly CSI-RS resources, that the UE shall measure. In fact, there could be carriers without SS/PBCH block and with CSI-RS that contains an SSB frequency location.

2. There are some of the measurement events that are triggered based on the comparison of the quality of two cells possibly from two different frequencies, while a single measurement object is linked to the measId and reportConfig, such as events:

A6: Neighbor becomes offset better than Secondary Cell (SCell)

Out of these six events, at least three events (A3, A5, and A6) may potentially involve measurements performed in two different frequencies, although a single measObjectNR will be linked to the reportConfig via the measId. Hence, especially in the case of these three events, it becomes very unclear from which measObjectNR the UE shall obtain the CQD parameters and, in the case of events comparing the quality of two cells, whether these parameters shall be the same or different for the two cells/two frequencies being compared. Notice that this problem is particularly more relevant for the serving cell measurements and in the case two frequencies are used for the same event, such as in A3, A5, and A6 events, or any event defined in the future that make comparisons between cell qualities in two different frequencies. However, even for the other events (A1, A2, and A4) some other consistency issues could exist and may represent an ambiguity problem.

Notice that, for the neighbor cell, the ambiguity may also exist as it is not clear what is meant by the "measObject is associated to NR" and/or whether that rule is applicable for both neighbor and serving cell measurements in the case of events A3, A5, and A6, as described in 5.5.3.1:

```
1> for each measId included in the measIdList within VarMeasConfig:
   2> if the reportType for the associated reportConfig is not set to reportCGI:
      3> if a measurement gap configuration is setup, or
      3> if the UE does not require measurement gaps to perform the concerned measurements:
         4> if s-MeasureConfig is not configured, or
         4> if s-MeasureConfig is set to ssb-RSRP and the PCell (or PSCell when the UE is in EN-DC) RSRP
            based on SS/PBCH block, after layer 3 filtering, is lower than ssb-RSRP, or
         4> if s-MeasureConfig is set to csi-RSRP and the PCell (or PSCell when the UE is in EN-DC) RSRP
            based on CSI-RS, after layer 3 filtering, is lower than csi-RSRP:
            5> if the measObject is associated to NR and the rsType is set to csi-rs:
               6> if reportQuantityRsIndexes for the associated reportConfig is configured:
                  7> derive layer 3 filtered beam measurements only based on CSI-RS for each measurement
                     quantity indicated in reportQuantityRsIndexes, as described in 5.5.3.3a;
               6> derive cell measurement results based on CSI-RS for each trigger quantity and each
                  measurement quantity indicated in reportQuantityCell using parameters from the associated
                  measObject, as described in 5.5.3.3;
            5> if the measObject is associated to NR and the rsType is set to ssb:
               6> if reportQuantityRsIndexes for the associated reportConfig is configured:
                  7> derive layer 3 beam measurements only based on SS/PBCH block for each measurement
                     quantity indicated in reportQuantityRsIndexes, as described in 5.5.3.3a;
               6> derive cell measurement results based on SS/PBCH block for each trigger quantity and each
                  measurement quantity indicated in reportQuantityCell using parameters from the associated
                  measObject, as described in 5.5.3.3;
            5> if the measObject is associated to E-UTRA:
               6> perform the corresponding measurements associated to neighbouring cells on the frequencies
                  indicated in the concerned measObject;
   2> perform the evaluation of reporting criteria as specified in 5.5.4.
```

A1: Serving becomes better than threshold

A2: Serving becomes worse than threshold

A3: Neighbor becomes offset better than Primary Cell (PCell)/Primary Secondary Cell (PSCell)

A4: Neighbor becomes better than threshold

A5: PCell/PSCell becomes worse than threshold1 and neighbor becomes better than threshold2

Yet another ambiguity relates to which measObjectNR to consider when the UE needs to include beam measurement information in measurement reports, as that can be on serving cell(s) and neighbor cells(s) where each one may have its own set of measObjectNR parameters.

Certain aspects of the present disclosure and their embodiments may provide solutions to these or other challenges. Embodiments are disclosed herein for enabling a UE to obtain parameters for performing CQD from a correct measurement object (measObject). In some embodiments, this disclosure describes a method performed by a UE being configured by the network with one or more measurement objects, where each measurement object contains parameters enabling the UE to perform CQD; the same UE being configured with measurement events each having a measurement identifier measId where each measId links one measObject to one reportConfig (where each event in event triggered measurement reporting, e.g., A1, A2, A3, A4, A5, A6), the method comprising the UE selecting the correct measObject from which the UE obtains the CQD parameters or, in a more general sense, measObject related parameters, as these are not only used for CQD but some are also used for selecting information to include in measurement reports.

There are, proposed herein, various embodiments which address one or more of the issues disclosed herein. Certain embodiments may provide one or more of the following technical advantages. The embodiments disclosed herein solve the ambiguity in the current NR specifications where, in many network configurations, the UE could not figure out which measObject to select and, consequently, which CQD parameters to be obtained. Solving this problem can prevent problems for the network such as different UEs with the same configuration being provided behaving differently in terms of event triggering due to the different ways cell quality has been derived. Additional advantages may be readily apparent in light of the following description, and certain embodiments may provide some, none, or all of these technical advantages.

First Embodiment

In a first embodiment, the UE obtains the parameters to perform CQD for serving cell(s) from the measObject containing the frequency information that matches the frequency information provided in the serving cell configuration (e.g., serving cell configuration is provided to the UE during SCell addition and/or handovers).

Figure 6:
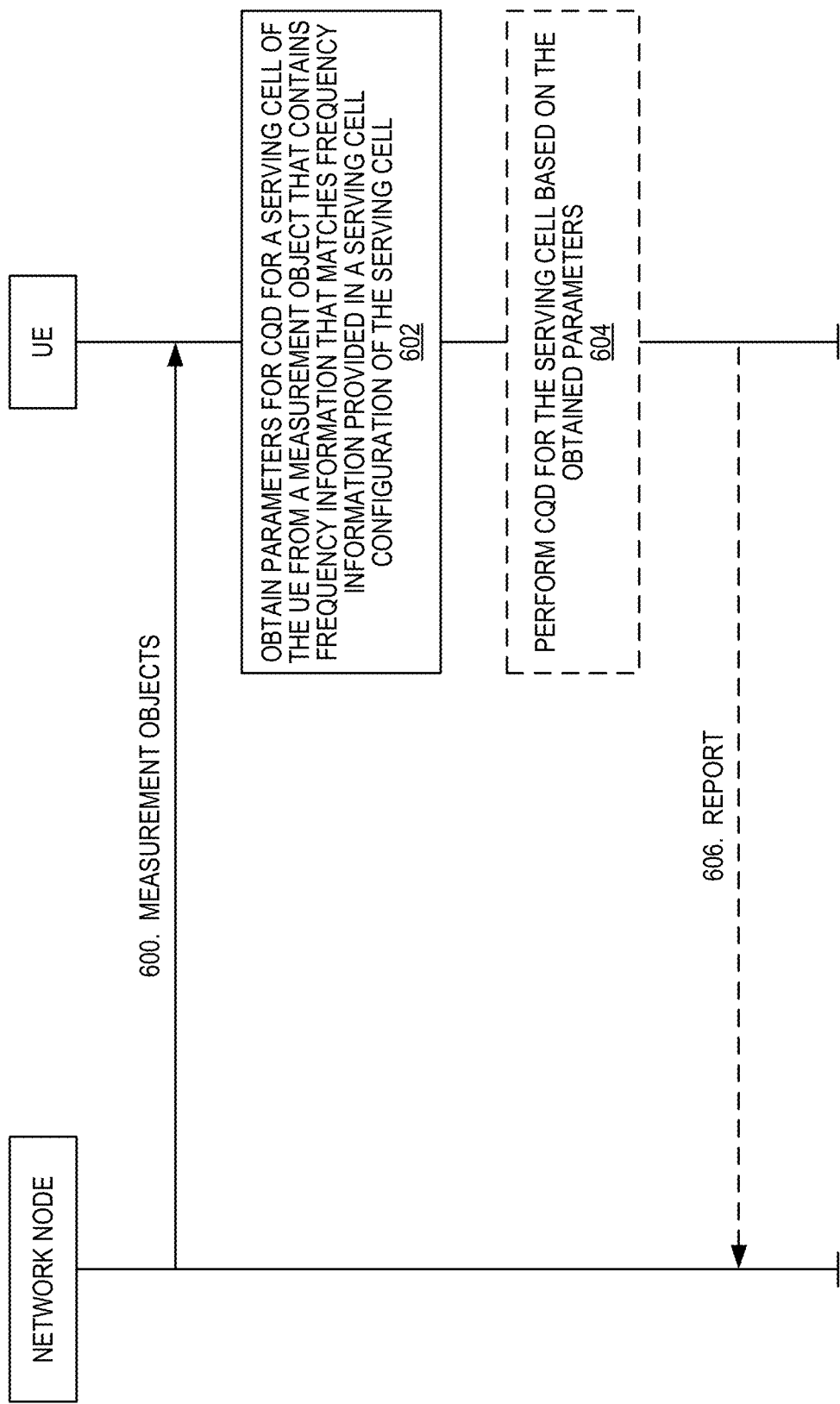
FIG. 6 illustrates the operation of a User Equipment (UE) and a network node in accordance with at least some aspects of an embodiment of the present disclosure.

FIG. 6 illustrates the operation of a UE and a network node (e.g., NR base station (gNB)) in accordance with at least some aspects of the first embodiment described herein. Optional steps are represented with dashed lines. As illustrated, the network node provides multiple measurement objects to the UE (step 600). In other words, the network node configures the UE with multiple measurement objects. The UE obtains parameters to perform CQD for a serving cell(s) of the UE from a measurement object that contains frequency information that matches frequency information provided in a serving cell configuration of the serving cell (step 602). Multiple examples of the types of frequency information in the measurement objects and the serving cell configuration that can be used for determining a match are provided below. Further, various examples of the obtained parameters are described herein. Some examples include, but are not limited to, the maximum number of beams to be averaged and the absolute threshold per reference signal type. Optionally, the UE performs CQD for the serving cell based on the obtained parameters (step 604). Note that the details of CQD are described above and are known to those of skill in the art and, as such, are not repeated here. The UE optionally reports a result of the CQD to the network node (step 606).

In this context, a first option for the frequency information can be the frequency location of the SSB to be measured or to be used only as sync source for CSI-RS resources. That SSB frequency location can be the sync raster Global Synchronization Channel Number (GSCN) provided both in the measurement object and in the serving cell configuration.

In this context, a second option frequency information can be the frequency location of the CSI-RS to be measured or a reference frequency that serves to locate where the CSI-RS in a Physical Resource Block (PRB) grid, possibly within a carrier. That frequency information can be encoded as the nominal frequency location of the so-called point A, encoded with the channel raster ARFCN, provided both in the measurement object and in the serving cell configuration.

In this context, a third option frequency information can be both the frequency location of the SSB and frequency location of the CSI-RS to be measured (or a reference frequency that serves to locate where the CSI-RS in a PRB grid, possibly within a carrier). As in the previous options, the matching of both parameters indicates to the UE which measObject to select to obtain parameters to perform CQD.

Parameters to be compared in measObjectNR and servingCellConfigCommon (in particular the FrequencyInfoDL that contains the exact parameters to be compared) are highlighted with bold text below:

MeasObjectNR

The IE MeasObjectNR specifies information applicable for SS/PBCH block(s) intra/inter-frequency measurements or CSI-RS intra/inter-frequency measurements.

MeasObjectNR Information Element

```
-- ASN1START
-- TAG-MEAS-OBJECT-NR-START
MeasObjectNR ::=                    SEQUENCE {
    ssbAbsoluteFreq                     GSCN-ValueNR,
    -- FFS whether reference frequency represents pointA            OPTIONAL,
    refFreqCSI-RS                       ARFCN-ValueNR
    ... }
```

The ServingCellConfigCommon IE is used to configure cell specific parameters of a UE's serving cell. The IE contains parameters which a UE would typically acquire from SSB, MIB or SIBs when accessing the cell from IDLE. With this IE, the network provides this information in dedicated signalling when configuring a UE with a SCells or with an additional cell group (SCG). It also provides it for SpCells (MCG and SCG) upon reconfiguration with sync.

ServingCellConfigCommon Information Element

```
-- ASN1START
-- TAG-SERVING-CELL-CONFIG-COMMON-START
ServingCellConfigCommon : :=           SEQUENCE {
  physCellId                           PhysCellId
    OPTIONAL, -- Cond HOAndServCellAdd,
  frequencyInfoDL                      FrequencyInfoDL
    OPTIONAL, -- Cond InterFreqHOAndServCellAdd
  ...
}
-- TAG-SERVING-CELL-CONFIG-COMMON-STOP
-- ASN1STOP
```

The IE FrequencyInfoDL provides basic parameters of a downlink carrier and transmission thereon.

FrequencyInfoDL Information Element

```
-- ASN1 START
-- TAG-FREQUENCY-INFO-DL-START
Frequency InfoDL : : =         SEQUENCE {
  -- Frequency of the SSB to be used for this serving cell.
  absoluteFrequencySSB              GSCN-ValueNR,
  -- The frequency domain offset between SSB and the overall resource block grid in number of
subcarriers.
  -- Absence of the field indicates that no offset is applied (offset = 0). See 38.211, section
7.4.3.1)
  ssb-SubcarrierOffset              INTEGER (1..15)              OPTIONAL,
  -- Absolute frequency position of the lowest subcarrier (point A) of the reference PRB (Common
PRB 0).
  -- Corresponds to L1 parameter 'offset-ref-low-scs-ref-PRB' (see 38.211, section FFS_Section)
  absoluteFrequencyPointA           ARFCN-ValueNR           OPTIONAL,
  -- A set of virtual carriers for different subcarrier spacings (numerologies). Defined in
relation to Point A.
  -- Corresponds to L1 parameter 'offset-pointA-set' (see 38.211, section FFS_Section)
  scs-SpecificCarriers              SEQUENCE (SIZE (1..ffsValue)) OF SCS-
SpecificVirtualCarrier,
  ...
}
-- TAG-FREQUENCY-INFO-UL-STOP
-- ASN1STOP
```

Hence, considering the example above, the comparisons are between:
absoluteFrequencySSB of frequencyInfoDL within ServingCellConfigCommon and ssbAbsoluteFreqwithin measObjectNR;
absoluteFrequencyPointA of frequencyInfoDL within ServingCellConfigCommon and refFreqCSI-RS within measObjectNR.

The comparison is done as follows. The UE selects the measurement object whose ssbAbsoluteFreq is the same as the absoluteFrequencySSB signaled in frequencyInfoDL within ServingCellConfigCommon. If more than one measObjectNR fulfills that criterion and are selected, the UE selects the measObjectNR whose refFreqCSI-RS is equals to absoluteFrequencyPointA of frequencyInfoDL within ServingCellConfigCommon.

That UE action described above is particularly important for the case where:
a. two or more measurement objects that the UE has been configured with have the same ssbAbsoluteFreq, but possibly different refFreqCSI-RS, and
b. the event the UE has been configured with only has an explicit configuration for which measObjectNR to consider for neighbor cell measurements, such as A3, A5, and A6.

A description of how the ambiguity is solved in this first embodiment for these three events will now be provided.

Event A3 (Neighbor becomes offset better than PCell/PSCell): In the definition of an A3 event, there is a comparison between a neighbor cell and the PCell (or PSCell). As part of the first embodiment, for a given measId, the UE selects the measObjectNR linked to that measId and reportConfig (with event triggered reporting and event A3 configured) to obtain the parameters to derive CQD of neighbor cells. For the CQD of the PCell or the PSCell, the UE selects the measObjectNR fulfilling the criterion described in the first embodiment, i.e. with the same frequency information as configured in ServingCellConfigCommon.

Below it is shown how the embodiment for this particular case can be implemented as changes to 3GPP TS 38.331 specifications:

The UE shall:

1> consider the entering condition for this event to be satisfied when condition A3-1, as specified below, is fulfilled;

1> consider the leaving condition for this event to be satisfied when condition A3-2, as specified below, is fulfilled;

-continued

1> in EN-DC, use the PSCell for Mp, Ofp and Ocp;
NOTE  The cell(s) that triggers the event is on the frequency indicated in the associated measObjectNR which may be different from the frequency used by the PCell/PSCell (when UE is in EN-DC).

Inequality A3-1 (Entering condition)
Mn+Ofn+Ocn−Hys>Mp+Ofp+Ocp+Off
Inequality A3-2 (Leaving condition)
Mn+Ofn+Ocn+Hys<Mp+Ofp+Ocp+Off
The variables in the formula are defined as follows:
   Mn is the measurement result of the neighbouring cell, not taking into account any offsets. Parameters for cell quality derivation of neighbouring cell(s) are obtained in the measObjectNR corresponding to the frequency of the neighbour cell i.e. the measObjectNR associated to the reportConfigNR and measId.
   Ofn is the frequency specific offset of the frequency of the neighbour cell (i.e. offsetFreq as defined within measObjectNR corresponding to the frequency of the neighbour cell). That corresponding measObjectNR is the one associated to that measId and reportConfigNR.
   Ocn is the cell specific offset of the neighbour cell (i.e. cellIndividualOffset as defined within measObjectNR corresponding to the frequency of the neighbour cell), and set to zero if not configured for the neighbour cell. That corresponding measObjectNR is the one associated to that measId and reportConfigNR.
   Mp is the measurement result of the PCell/PSCell, not taking into account any offsets. Parameters for cell quality derivation of PCell or PSCell are obtained in the measObjectNR with whose ssbAbsoluteFreq is equals to absoluteFrequencySSB of frequencyInfoDL within ServingCellConfigCommon. If more than one measObjectNR with same ssbAbsoluteFreq exist, the UE selects the measObjectNR whose refFreqCSI-RS is equals to absoluteFrequencyPointA of frequencyInfoDL within ServingCellConfigCommon.
   Ofp is the frequency specific offset of the frequency of the PCell/PSCell (i.e. offsetFreq as defined within measObjectNR corresponding to the frequency of the PCell/PSCell). That corresponding measObjectNR is the one whose ssbAbsoluteFreq is equals to absoluteFrequencySSB of frequencyInfoDL within ServingCellConfigCommon. If more than one measObjectNR with same ssbAbsoluteFreq exist, the UE selects the measObjectNR whose refFreqCSI-RS is equals to absoluteFrequencyPointA of frequencyInfoDL within ServingCellConfigCommon.
   Ocp is the cell specific offset of the PCell/PSCell (i.e. cellIndividualOffset as defined within measObjectNR corresponding to the frequency of the PCell/PSCell), and is set to zero if not configured for the PCell/PSCell. That corresponding measObjectNR is the one whose ssbAbsoluteFreq is equals to absoluteFrequencySSB of frequencyInfoDL within ServingCellConfigCommon. If more than one measObjectNR with same ssbAbsoluteFreq exist, the UE selects the measObjectNR whose refFreqCSI-RS is equals to absoluteFrequencyPointA of frequencyInfoDL within ServingCellConfigCommon.
   Hys is the hysteresis parameter for this event (i.e. hysteresis as defined within reportConfigNR for this event).
   Off is the offset parameter for this event (i.e. a3-Offset as defined within reportConfigNR for this event).
   Mn, Mp are expressed in dBm in case of RSRP, or in dB in case of RSRQ and RS-SINR.
   Ofn, Ocn, Ofp, Ocp, Hys, Off are expressed in dB.

Event A5 (PCell/PSCell becomes worse than threshold1 and neighbor becomes better than threshold2): In the existing definition of an A5 event, there is a comparison between a neighbor cell and a threshold1 and the PCell (or PSCell) and threshold2. As part of the first embodiment, for a given measId, the UE selects the measObjectNR linked to that measId and reportConfig (with event triggered reporting and event A5 configured) to obtain the parameters to derive CQD of neighbor cells. For the CQD of the PCell or the PSCell, the UE selects the measObjectNR fulfilling the criterion described in the first embodiment, i.e. with the same frequency information as configured in ServingCellConfigCommon.

Below it is shown how the embodiment for this particular case can be implemented as changes to 3GPP TS 38.331 specifications:

5.5.4.6 Event A5 (PCell/PSCell Becomes Worse than Threshold1 and Neighbour Becomes Better than Threshold2)

The UE shall:

1> consider the entering condition for this event to be satisfied when both condition A5-1 and condition A5-2, as specified below, are fulfilled;
   1> consider the leaving condition for this event to be satisfied when condition A5-3 or condition A5-4, i.e. at least
       one of the two, as specified below, is fulfilled;
   1> in EN-DC, use the PSCell for Mp;
   NOTE:  The cell(s) that triggers the event is on the frequency indicated in the associated measObjectNR which may be different from the frequency used by the PCell/PSCell.

Inequality A5-1 (Entering condition 1)
Mp+Hys<Thresh1
Inequality A5-2 (Entering condition 2)
Mn+Ofn+Ocn−Hys>Thresh2
Inequality A5-3 (Leaving condition 1)
Mp−Hys>Thresh1
Inequality A5-4 (Leaving condition 2)
Mn+Ofn+Ocn+Hys<Thresh2
The variables in the formula are defined as follows:
   Mp is the measurement result of the PCell/PSCell, not taking into account any offsets. Parameters for cell quality derivation of PCell or PSCell are obtained in the measObjectNR with whose ssbAbsoluteFreq is equals to absoluteFrequencySSB of frequencyInfoDL within ServingCellConfigCommon. If more than one measObjectNR with same ssbAbsoluteFreq exist, the UE selects the measObjectNR whose refFreqCSI-RS is equals to absoluteFrequencyPointA of frequencyInfoDL within ServingCellConfigCommon.

Mn is the measurement result of the neighbouring cell, not taking into account any offsets. Parameters for cell quality derivation of neighbouring cell(s) are obtained in the measObjectNR corresponding to the frequency of the neighbour cell i.e. the measObjectNR associated to the reportConfigNR and measId.

Ofn is the frequency specific offset of the frequency of the neighbour cell (i.e. offsetFreq as defined within measObjectNR corresponding to the frequency of the neighbour cell). That corresponding measObjectNR is the one associated to that measId and reportConfigNR.

Ocn is the cell specific offset of the neighbour cell (i.e. cellIndividualOffset as defined within measObjectNR corresponding to the frequency of the neighbour cell), and set to zero if not configured for the neighbour cell. That corresponding measObjectNR is the one associated to that measId and reportConfigNR.

Hys is the hysteresis parameter for this event (i.e. hysteresis as defined within reportConfigNR for this event).

Thresh1 is the threshold parameter for this event (i.e. a5-Threshold1 as defined within reportConfigNR for this event).

Thresh2 is the threshold parameter for this event (i.e. a5-Threshold2 as defined within reportConfigNR for this event).

Mn, Mp are expressed in dBm in case of RSRP, or in dB in case of RSRQ and RS-SINR.

Ofn, Ocn, Hys are expressed in dB.

Thresh1 is expressed in the same unit as Mp.

Thresh2 is expressed in the same unit as Mn.

Event A6 (Neighbor becomes offset better than SCell): In the existing definition of an A6+ event, there is a comparison between a neighbor cell and an SCell where the neighbor(s) is on the same frequency as the SCell, i.e. both are on the frequency indicated in the associated measObjectNR. Hence, in that case, according to the first embodiment, although the CQD of the SCell measurement is performed on a serving cell, the UE obtains the parameters for CQD from the measObjectNR associated to the reportConfigNR configuring A6 and that measId.

5.5.4.7 Event A6 (Neighbour Becomes Offset Better than SCell)

The UE shall:

1> consider the entering condition for this event to be satisfied when condition A6-1, as specified below, is fulfilled;

1> consider the leaving condition for this event to be satisfied when condition A6-2, as specified below, is fulfilled;

1> for this measurement, consider the (secondary) cell that is configured on the frequency indicated in the associated measObjectNR to be the serving cell; Parameters for cell quality derivation of the SCell is obtained in the measObjectNR associated to the reportConfigNR and measId.

NOTE 1: The neighbour(s) is on the same frequency as the SCell i.e. both are on the frequency indicated in the associated measObjectNR. Parameters for cell quality derivation of the neighbour(s) are also obtained in the measObjectNR associated to the reportConfigNR and measId.

NOTE 2: In EN-DC, the cell(s) that triggers the event is on the frequency indicated in the associated measObject shall be different from the frequency used by the PSCell.

Inequality A6-1 (Entering condition)

Mn+Ocn−Hys>Ms+Ocs+Off

Inequality A6-2 (Leaving condition)

Mn+Ocn+Hys<Ms+Ocs+Off

The variables in the formula are defined as follows:

Mn is the measurement result of the neighbouring cell, not taking into account any offsets. Parameters for cell quality derivation of the neighbour(s) are also obtained in the measObjectNR associated to the reportConfigNR and measId.

Ocn is the cell specific offset of the neighbour cell (i.e. cellIndividualOffset as defined within measObjectNR corresponding to the frequency of the neighbour cell), and set to zero if not configured for the neighbour cell. That corresponding measObjectNR is the one associated to that measId and reportConfigNR.

Ms is the measurement result of the serving cell, not taking into account any offsets. Parameters for cell quality derivation of the neighbour(s) are also obtained in the measObjectNR associated to the reportConfigNR and measId.

Ocs is the cell specific offset of the serving cell (i.e. cellIndividualOffset as defined within measObjectNR corresponding to the serving frequency), and is set to zero if not configured for the serving cell. That corresponding measObjectNR is the one associated to that measId and reportConfigNR.

Hys is the hysteresis parameter for this event (i.e. hysteresis as defined within reportConfigNR for this event).

Off is the offset parameter for this event (i.e. a6-Offset as defined within reportConfigNR for this event).

Mn, Ms are expressed in dBm in case of RSRP, or in dB in case of RSRQ and RS-SINR.

Ocn, Ocs, Hys, Off are expressed in dB.

Editor's Note: FFS Details of B1/B2 inter-RAT events and periodical reporting for LTE measurements.

For CQD when the UE is configured with events A1, A2, and A4, the parameters are obtained from the measObjectNR that is configured in the measId and associated to that reportConfigNR. A possible implementation is shown as follows:

5.5.4.2 Event A1 (Serving Becomes Better than Threshold)
The UE shall:

---

1> consider the entering condition for this event to be satisfied when condition A1-1, as specified below, is fulfilled;
1> consider the leaving condition for this event to be satisfied when condition A1-2, as specified below, is fulfilled;
1> for this measurement, consider the primary cell as an NR PCell, NR PSCell (when UE is in EN-DC), or secondary cell that are configured on the frequency indicated in the associated measObjectNR to be the serving cell;

Inequality A1-1 (Entering condition)
$Ms - Hys > Thresh$
Inequality A1-2 (Leaving condition)
$Ms + Hys < Thresh$
The variables in the formula are defined as follows:
   Ms is the measurement result of the serving cell, not taking into account any offsets. Parameters for cell quality derivation of the SCell is obtained in the measObjectNR associated to the reportConfigNR and measId.
   Hys is the hysteresis parameter for this event (i.e. hysteresis as defined within reportConfigNR for this event).
   Thresh is the threshold parameter for this event (i.e. a1-Threshold as defined within reportConfigNR for this event).
   Ms is expressed in dBm in case of RSRP, or in dB in case of RSRQ and RS-SINR.
   Hys is expressed in dB.
   Thresh is expressed in the same unit as Ms.

---

5.5.4.3 Event A2 (Serving Becomes Worse than Threshold)
The UE shall:

---

1> consider the entering condition for this event to be satisfied when condition A2-1, as specified below, is fulfilled;
1> consider the leaving condition for this event to be satisfied when condition A2-2, as specified below, is fulfilled;
1> for this measurement, consider the primary cell as an NR PCell, NR PSCell (when UE is in EN-DC), or secondary cell that is configured on the frequency indicated in the associated measObjectNR to be the serving cell; Parameters for cell quality derivation of the serving cell is obtained in the measObjectNR associated to the reportConfigNR and measId.

Inequality A2-1 (Entering condition)
$Ms + Hys < Thresh$
Inequality A2-2 (Leaving condition)
$Ms - Hys > Thresh$
The variables in the formula are defined as follows:
   Ms is the measurement result of the serving cell, not taking into account any offsets. Parameters for cell quality derivation of the serving cell is obtained in the measObjectNR associated to the reportConfigNR and measId.
   Hys is the hysteresis parameter for this event (i.e. hysteresis as defined within reportConfigNR for this event).
   Thresh is the threshold parameter for this event (i.e. a2-Threshold as defined within reportConfigNR for this event).
   Ms is expressed in dBm in case of RSRP, or in dB in case of RSRQ and RS-SINR.
   Hys is expressed in dB.
   Thresh is expressed in the same unit as Ms.

---

5.5.4.5 Event A4 (Neighbour Becomes Better than Threshold)
The UE shall:

---

1> consider the entering condition for this event to be satisfied when condition A4-1, as specified below, is fulfilled;
1> consider the leaving condition for this event to be satisfied when condition A4-2, as specified below, is fulfilled;

Inequality A4-1 (Entering condition)
$Mn + Ofn + Ocn - Hys > Thresh$
Inequality A4-2 (Leaving condition)
$Mn + Ofn + Ocn + Hys < Thresh$
The variables in the formula are defined as follows:
   Mn is the measurement result of the neighbouring cell, not taking into account any offsets. Parameters for cell quality derivation of the serving cell is obtained in the measObjectNR associated to the reportConfigNR and measId.
   Ofn is the frequency specific offset of the frequency of the neighbour cell (i.e. offsetFreq as defined within measObjectNR corresponding to the frequency of the neighbour cell). That s for cell quality derivation of the serving cell is obtained in the measObjectNR associated to the reportConfigNR and measId.

-continued

Ocn is the cell specific offset of the neighbour cell (i.e. cellIndividualOffset as defined within measObjectNR corresponding to the frequency of the neighbour cell), and set to zero if not configured for the neighbour cell. That corresponding measObjectNR is the one associated to that measId and reportConfigNR.
Hys is the hysteresis parameter for this event (i.e. hysteresis as defined within reportConfigNR for this event).
Thresh is the threshold parameter for this event (i.e. a4-Threshold as defined within reportConfigNR for this event).
Mn is expressed in dBm in case of RSRP, or in dB in case of RSRQ and RS-SINR.
Ofn, Ocn, Hys are expressed in dB.
Thresh is expressed in the same unit as Mn.

Second Embodiment

In a second embodiment, for a given measId associated to a given reportConfigNR, the UE obtains the parameters to perform CQD for serving cell(s) and neighbor cells from the same measObjectNR.

In one solution, the measObjectNR is the measObjectNR associated to the given measId. For events that both serving and neighbor cell measurements are performed (such as A3, A5, and A6) and events for serving/neighbors only (A1, A2, and A4), the UE obtains the CQD parameters only that that measObjectNR and uses the same values to compute CQD for serving and neighboring cells.

In another solution, the measObjectNR is the measObjectNR associated to the serving cell indicated in the event whenever a serving cell is part of the event configuration. For events that both serving and neighbor cell measurements are performed (such as A3, A5, and A6) where there is a serving cell measurement configured as part of the triggering condition, the UE obtains the CQD parameters from the measObjectNR associated to the serving cell, according to the rule defined in the first embodiment. In other words, the UE obtains the parameters to perform CQD on serving cell(s) from the measObject containing the frequency information that matches the frequency information provided in the serving cell configuration (e.g., serving cell configuration is provided to the UE during SCell addition and/or handovers).

Embodiments Related to Ambiguity Solving in Beam Reporting

To perform the beam level reporting, the UE uses the parameter absThreshSS-BlocksConsolidation or absThreshCSI-RS-BlocksConsolidation to select the beams to be reported. Selection amongst these two thresholds—absThreshSS-BlocksConsolidation and absThreshCSI-RS-BlocksConsolidation—depends on the rs-Type as indicated in the corresponding reportConfig. However, for those events where more than one measurement object is involved, the UE will have to know whether to use the threshold as configured in each of the measObject to which the cell belongs to or the threshold as configured in the measObject which is included in the measConfig.

In one sub-embodiment, the UE uses different thresholds for different cells depending on the measObject to which those cells belong to. Based on this, an example embodiment text proposal will look as below (bold text indicates new additions; double braces indicate text for removal):
Reporting of Beam Measurement Information
For beam measurement information to be included in a measurement report the UE shall:

```
1> if reportType is set to eventTriggered:
    2> consider the trigger quantity as the sorting quantity;
1> if reportType is set to periodical:
    2> if a single reporting quantity is set to TRUE in reportQuantityRsIndexes;
        3> consider the configured single quantity as the sorting quantity;
    2> else:
        3> if rsrp is set to TRUE;
4> consider RSRP as the sorting quantity;
        3> else:
            4> consider RSRQ as the sorting quantity;
1> For each cell to be included in the measurement report, set rsIndexResults to include up to
    maxNrofRsIndexesToReport SS/PBCH block indexes or CSI-RS indexes in order of decreasing sorting quantity
    as follows:
    2> if the measurement information to be included is based on SS/PBCH block:
        3> include within resultsSSB-Indexes the index associated to the best beam for that SS/PBCH block sorting
            quantity and the remaining beams whose sorting quantity is above absThreshSS-BlocksConsolidation
            defined in the {{VarMeasConfig for the corresponding }}measObject corresponding to the cell under
            consideration;
        3> if includeBeamMeasurements is configured, include the SS/PBCH based measurement results for the
            quantities in reportQuantityRsIndexes set to TRUE for each SS/PBCH index;
    2> else if the beam measurement information to be included is based on CSI-RS:
        3> include within resultsCSI-RS-Indexes the index associated to the best beam for that CSI-RS sorting
            quantity and the remaining beams whose sorting quantity is above absThreshCSI-RS-Consolidation
            defined in the {{VarMeasConfig for the corresponding }}measObject corresponding to the cell under
            consideration;
        3> if includeBeamMeasurements is configured, include the CSI-RS based measurement results for the
            quantities in reportQuantityRsIndexes set to TRUE for each CSI-RS index;
```

In another sub-embodiment, the UE uses the same threshold for each of the cells to be reported and this threshold is the one configured in the measObject configured in the corresponding measID. Based on this, an example embodiment text proposal will look as below (bold text indicates new additions):

Reporting of Beam Measurement Information

For beam measurement information to be included in a measurement report the UE shall:

```
1> if reportType is set to eventTriggered:
    2> consider the trigger quantity as the sorting quantity;
1> if reportType is set to periodical:
    2> if a single reporting quantity is set to TRUE in reportQuantityRsIndexes;
        3> consider the configured single quantity as the sorting quantity;
    2> else:
        3> if rsrp is set to TRUE;
            4> consider RSRP as the sorting quantity;
        3> else:
            4> consider RSRQ as the sorting quantity;
1> For each cell to be included in the measurement report, set rsIndexResults to include up to
maxNrofRsIndexesToReport SS/PBCH block indexes or CSI-RS indexes in order of decreasing sorting quantity
as follows:
    2> if the measurement information to be included is based on SS/PBCH block:
        3> include within resultsSSB-Indexes the index associated to the best beam for that SS/PBCH block sorting
            quantity and the remaining beams whose sorting quantity is above absThreshSS-BlocksConsolidation
            defined in the {{VarMeasConfig for the corresponding }}measObject for the corresponding to
            measID;
        3> if includeBeamMeasurements is configured, include the SS/PBCH based measurement results for the
            quantities in reportQuantityRsIndexes set to TRUE for each SS/PBCH index;
    2> else if the beam measurement information to be included is based on CSI-RS:
        3> include within resultsCSI-RS-Indexes the index associated to the best beam for that CSI-RS sorting
            quantity and the remaining beams whose sorting quantity is above absThreshCSI-RS-Consolidation
            defined in the {{VarMeasConfig for the corresponding }}measObject for the corresponding to
            measID;
        3> if includeBeamMeasurements is configured, include the CSI-RS based measurement results for the
            quantities in reportQuantityRsIndexes set to TRUE for each CSI-RS index;
```

Embodiments Related to Ambiguity Solving in Serving Carrier when More than One Measurement Object Points to the Same SS/PBCH Block Frequency Location When there is more than one measurement object pointing to the same SS block, the UE cannot use just the pointer to the SS block to identify which Measurement Object (MO) corresponds to the MO of the serving carrier. To resolve such a scenario, in the current specification a parameter is introduced in the MO, namely, isServingCellMO.

```
CSI-RS-ResourceConfigMobility : :=    SEQUENCE {
    -- MO specific values
        isServingCellMO                BOOLEAN,
    -- Subcarrier spacing of CSI-RS.
    -- Supported values are 15, 30 or 60 kHz (<6GHz), 60 or 120 kHz (>6GHZ).
    -- Corresponds to L1 parameter 'Numerology' (see 38.211, section FFS_Section)
    subcarrierSpacingCSI-RS            SubcarrierSpacingCSI-RS,
    -- List of cells
    csi-RS-CellList-Mobility           SEQUENCE (SIZE (1..maxNrofCSI-RS-CellsRRM)) OF CSI-RS-CellMobility
}
```

Figure 7:
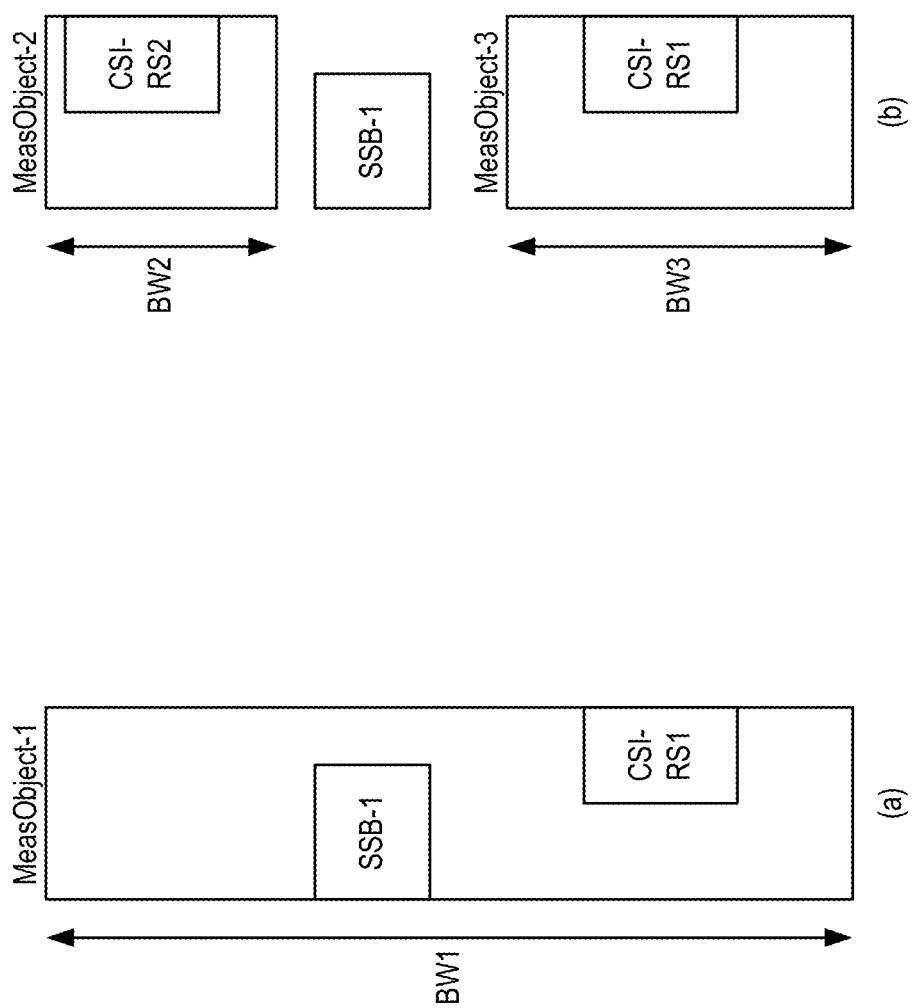
FIG. 7 illustrates different scenarios for serving cell measurement object identification.

FIG. 7 illustrates different scenarios for serving cell measurement object identification. There are different scenarios that can be considered as shown in FIG. 7. Based on different configurations, the UE derives which MO corresponds to the serving cell MO in different ways based on existing methods in the specification.

1. In scenario (a) of FIG. 7, the measurement object contains both SS blocks and CSI-RSs. The UE gets to know that this measurement object is the MO corresponding to the serving carrier with the help of the absoluteFrequencySSB parameter in FrequencyInfoDL that is provided as part of serving cell configuration. Based on this, when the UE performs measurements on the SSBs, then the UE treats SSB-1 related measurements as the serving cell Radio Resource Management (RRM) measurements while evaluating an SSB specific event triggering criterion. Additionally, if the UE is also configured with CSI-RS related events, the UE will treat CSI-RS1 related measurements as the serving cell RRM measurements while evaluating a CSI-RS specific event triggering criterion. In this scenario, even if the isServingCellMO in the MO is set to false, the UE will treat this MO as the MO corresponding to the serving frequency.

2. In scenario (b) of FIG. 7, the UE is configured with two measurement objects. Both measurement objects correspond to CSI-RS configurations for RRM measurements. For both of these measurement objects, the SSB-1 is configured as the timing reference provider. In this scenario, if the UE needs to be configured with the measurement object corresponding to CSI-RS3 as the serving frequency related measurement object (MO-3), then the parameter isServingCellMO in the MO-3 is set to true and the corresponding parameter in MO-2 is set to false. However, if the UE performs an inter-frequency handover from CSI-RS3 related measurement object to CSI-RS2 related measurement object, then the UE needs to be updated with updated values for isServingCellMO for both of these measurement objects. This will lead to the removal of measurements related to these measurement objects.

As can be seen from the above observations (Observation-1 and Observation-2), having the parameter isServing- Cel/MO in the measurement object is not ideal. However, the UE needs to know which measurement object corresponds to its serving frequency. This information can be extracted by the UE from the existing Information Elements (IEs) in the serving cell configuration. The IE FrequencyInfoDL is configured as part of the serving cell configuration. This IE contains two parameters:
1. absoluteFrequencySSB: This parameter points to the frequency location of the SSB used for this serving cell.
2. absoluteFrequencyPointA: This parameter points to the lowest frequency location of the carrier bandwidth of the serving carrier.

Using these two parameters, the UE can identify the corresponding measurement object that should be treated as the measurement object corresponding to the serving carrier. For scenario (a) shown in FIG. 7, absoluteFrequencySSB and absoluteFrequencyPointA have corresponding matching values in the measurement object. The value provided for the parameter absoluteFrequencySSB in FrequencyInfoDL will be same as ssbAbsoluteFreq in the measurement object and the value provided for absoluteFrequencyPointA in FrequencyInfoDL will be same as refFreqCSI-RS provided in measurement object. Using this comparison, the UE will get to know that MO-1 is the measurement object corresponding to the serving carrier. For scenario (b) shown in FIG. 7, let us consider that the MO-2 needs to be the measurement object corresponding to the serving carrier. The value provided for the parameter absoluteFrequencySSB in FrequencyInfoDL will be same as ssbAbsoluteFreq in the MO-2 and MO-3. However, the value provided for absoluteFrequencyPointA in FrequencyInfoDL will be same as refFreqCSI-RS provided in MO-2 and it will be different for MO-3. Using this comparison, the UE will get to know that MO-2 is the measurement object corresponding to the serving carrier.

Based on this analysis, the UE identifies its measurement object corresponding to the serving frequency by comparing absoluteFrequencySSB and absoluteFrequencyPointA parameters in FrequencyInfoDL with ssbAbsoluteFreq and refFreqCSI-RS parameter in measurement object respectively. An example text proposal based on this explanation is given below (bold text shows the new additions).

5.5.1 Introduction

The network may configure an RRC_CONNECTED UE to perform measurements and report them in accordance with the measurement configuration. The measurement configuration is provided by means of dedicated signalling i.e. using the RRCReconfiguration.

The network may configure the UE to perform the following types of measurements:

- NR measurements.
- Inter-RAT measurements of E-UTRA frequencies.

The network may configure the UE to perform the following NR measurements, based on different RS types SS/PBCH Block or CSI-RS:
- SS/PBCH Block based intra-frequency measurements: measurements at SSB(s) of neighbour cell(s) where both the center frequency(ies) and subcarrier spacing are the same as the cell-defining SSB of each serving cell.
- SS/PBCH Block based inter-frequency measurements: measurements at SSB(s) of neighbour cell(s) that have different center frequency(ies) or different subcarrier spacing compared to the cell-defining SSB of each serving cell.
- CSI-RS based intra-frequency measurements: measurements at CSI-RS(s) resource(s) of configured neighbour cell(s) whose bandwidth(s) are within the bandwidth(s) of the CSI-RS resource(s) on the serving cell(s) configured for measurements and having the same subcarrier spacing of the CSI-RS resource(s) on the serving cell(s) configured for measurements.
- CSI-RS based inter-frequency measurements: measurements at CSI-RS(s) resource(s) of configured neighbour cell(s) whose bandwidth(s) are not within the bandwidth(s) or having different subcarrier spacing compared to the CSI-RS resource(s) on the serving cell(s) configured for measurements.

Editor's Note: FFS Whether the definition of inter-frequency and intra-frequency measurements provided by RAN4 should be removed from 38.331.

The network may configure the UE to report the following measurement information based on SS/PBCH block(s):
- Measurement results per SS/PBCH block.
- Measurement results per cell based on SS/PBCH block(s).
- SS/PBCH block(s) indexes.

The network may configure the UE to report the following measurement information based on CSI-RS resources:
- Measurement results per CSI-RS resource.
- Measurement results per cell based on CSI-RS resource(s).
- CSI-RS resource measurement identifiers.

The measurement configuration includes the following parameters:
1. Measurement objects: A list of objects on which the UE shall perform the measurements.
- For intra-frequency and inter-frequency measurements a measurement object is associated to an NR carrier frequency. Associated with this NR carrier frequency, the network may configure a list of cell specific offsets, a list of 'blacklisted' cells and a list of 'whitelisted' cells. Blacklisted cells are not applicable in event evaluation or measurement reporting. Whitelisted cells are the only ones applicable in event evaluation or measurement reporting.

Editor's Note: Revisit the formulation below, and as well as how to capture the following additional agreements:
    2    More than one MO with CSI-RS resources for measurement can be associated to the same SSB location in frequency. The SSB is at least used for timing reference.
    3    In case that more than one MO with CSI-RS resources for measurement is associated to the same SSB location in frequency the UE is indicated which MO corresponds to the serving carrier.

- UE determines which MO corresponds to the serving cell frequency from the frequency location of the cell-defining SSB that is contained within the serving cell configuration and the frequency pointer to the pointA contained within the serving cell configuration. The UE shall identify the MO corresponding to the serving cell frequency by:
    1> if more than one MO have the same global synchronization channel raster number (ssbAbsoluteFreq) pointing to the same frequency location as that of the cell-defining SSB (absoluteFrequencySSB) within the serving cell configuration:
        2> amongst the MOs that have the same global synchronization channel raster number pointing to the same frequency location as that of the cell-defining SSB within the serving cell configuration, consider the MO that has the same frequency reference to pointA

Figure 8:
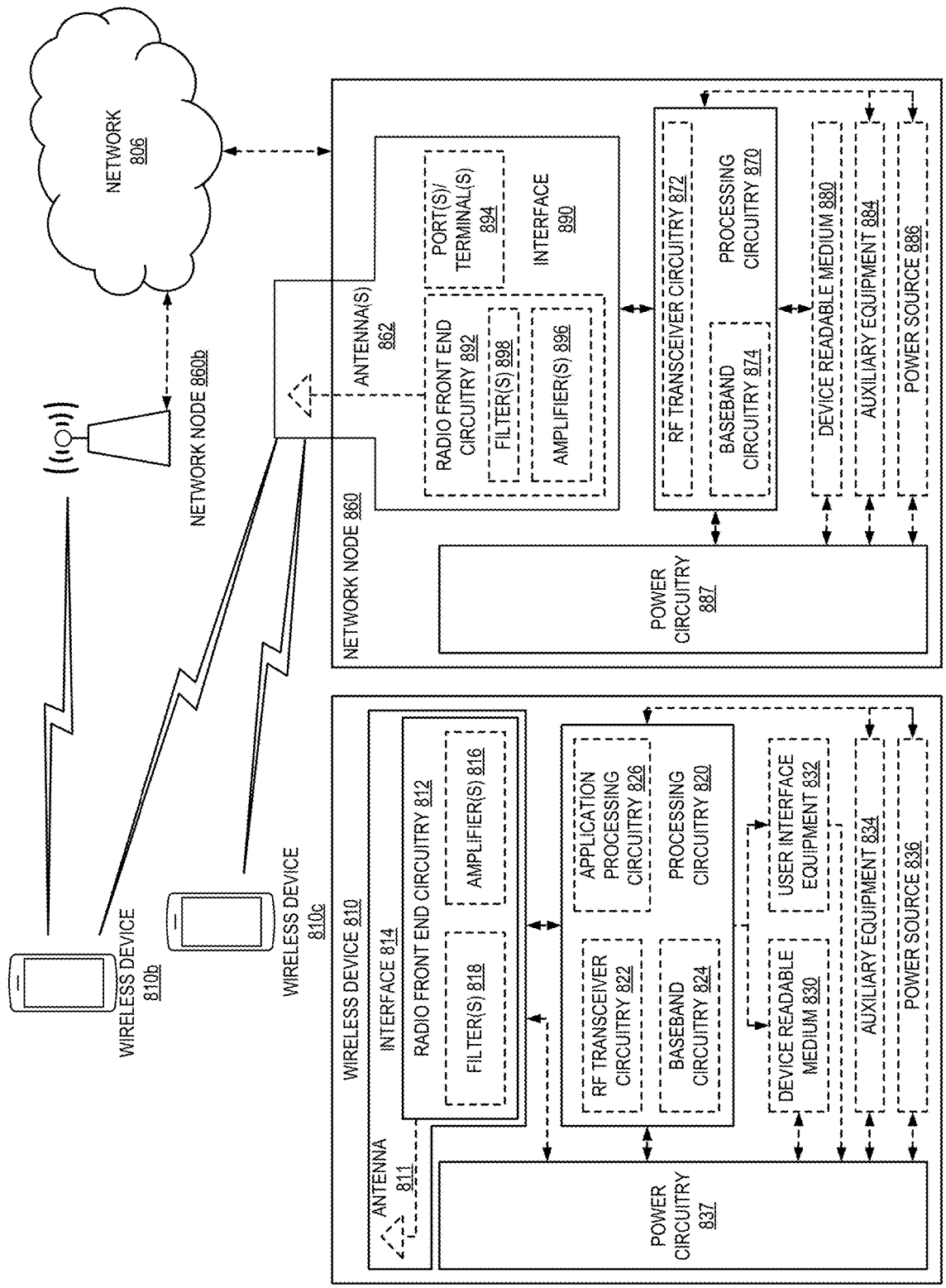
FIG. 8 illustrates wireless network in accordance with some embodiments.

(refFreqCSI-RS) as that of the frequency pointer to absolute frequency position of the
lowest subcarrier of reference PRB (absoluteFrequencyPointA) in serving cell configuration
to be the MO corresponding to the serving frequency;
1> else:
2> the MO having the same global synchronization channel raster number as that of the cell-
defining SSB within the serving cell configuration is considered as the MO corresponding to
the serving cell frequency;

Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network 806, network nodes 860 and 860*b*, and WDs 810, 810*b*, and 810*c*. In practice, a wireless network may further include any additional elements suitable to support communication between wireless devices or between a wireless device and another communication device, such as a landline telephone, a service provider, or any other network node or end device. Of the illustrated components, network node 860 and Wireless Device (WD) 810 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), LTE, and/or other suitable Second, Third, Fourth, or Fifth Generation (2G, 3G, 4G, or 5G) standards; Wireless Local Area Network (WLAN) standards, such as the IEEE 802.11 standards; and/or any other appropriate wireless communication standard, such as the Worldwide Interoperability for Microwave Access (WiMax), Bluetooth, Z-Wave, and/or ZigBee standards.

Network 806 may comprise one or more backhaul networks, core networks, IP networks, Public Switched Telephone Networks (PSTNs), packet data networks, optical networks, Wide Area Networks (WANs), Local Area Networks (LANs), WLANs, wired networks, wireless networks, metropolitan area networks, and other networks to enable communication between devices.

Network node 860 and WD 810 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged, and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, Access Points (APs) (e.g., radio access points), Base Stations (BSs) (e.g., radio base stations, Node Bs, and evolved Node Bs (eNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or Remote Radio Units (RRUs), sometimes referred to as Remote Radio Heads (RRHs). Such RRUs may or may not be integrated with an antenna as an antenna integrated radio. Parts of a distributed radio base station may also be referred to as nodes in a Distributed Antenna System (DAS). Yet further examples of network nodes include Multi-Standard Radio (MSR) equipment such as MSR BSs, network controllers such as Radio Network Controllers (RNCs) or Base Station Controllers (BSCs), Base Transceiver Stations (BTSs), transmission points, transmission nodes, Multi-Cell/Multicast Coordination Entities (MCEs), core network nodes (e.g., Mobile Switching Centers (MSCs), Mobility Management Entities (MMEs)), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node 860 includes processing circuitry 870, device readable medium 880, interface 890, auxiliary equipment 884, power source 886, power circuitry 887, and antenna 862. Although network node 860 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of network node 860 are depicted as single boxes located within a larger box, or nested within multiple boxes, in practice, a network node may comprise multiple different physical components that make up a single illustrated component (e.g., device readable medium 880 may comprise multiple separate hard drives as well as multiple Random Access Memory (RAM) modules).

Similarly, network node 860 may be composed of multiple physically separate components (e.g., a Node B component and a RNC component, or a BTS component and a BSC component, etc.), which may each have their own respective components. In certain scenarios in which network node 860 comprises multiple separate components (e.g., BTS and BSC components), one or more of the separate components may be shared among several network nodes. For example, a single RNC may control multiple Node Bs. In such a scenario, each unique Node B and RNC pair may in some instances be considered a single separate network node. In some embodiments, network node 860 may be configured to support multiple Radio Access Technologies (RATs). In such embodiments, some components may be duplicated (e.g., separate device readable medium 880 for the different RATs) and some components may be reused (e.g., the same antenna 862 may be shared by the RATs). Network node 860 may also include multiple sets of the various illustrated components for different wireless technologies integrated into network node 860, such as, for example, GSM, Wideband Code Division Multiple Access (WCDMA), LTE, NR, WiFi, or Bluetooth wireless technologies. These wireless technologies may be integrated into the same or different chip or set of chips and other components within network node 860.

Processing circuitry 870 is configured to perform any determining, calculating, or similar operations (e.g., certain obtaining operations) described herein as being provided by a network node. These operations performed by processing circuitry 870 may include processing information obtained by processing circuitry 870 by, for example, converting the obtained information into other information, comparing the obtained information or converted information to information stored in the network node, and/or performing one or more operations based on the obtained information or converted information, and as a result of said processing making a determination.

Processing circuitry 870 may comprise a combination of one or more of a microprocessor, controller, microcontroller, Central Processing Unit (CPU), Digital Signal Processor (DSP), Application Specific Integrated Circuit (ASIC), Field Programmable Gate Array (FPGA), or any other suitable computing device, resource, or combination of hardware, software and/or encoded logic operable to provide, either alone or in conjunction with other network node 860 components, such as device readable medium 880, network node 860 functionality. For example, processing circuitry 870 may execute instructions stored in device readable medium 880 or in memory within processing circuitry 870. Such functionality may include providing any of the various wireless features, functions, or benefits discussed herein. In some embodiments, processing circuitry 870 may include a System on a Chip (SOC).

In some embodiments, processing circuitry 870 may include one or more of Radio Frequency (RF) transceiver circuitry 872 and baseband processing circuitry 874. In some embodiments, RF transceiver circuitry 872 and baseband processing circuitry 874 may be on separate chips (or sets of chips), boards, or units, such as radio units and digital units. In alternative embodiments, part or all of RF transceiver circuitry 872 and baseband processing circuitry 874 may be on the same chip or set of chips, boards, or units In certain embodiments, some or all of the functionality described herein as being provided by a network node, base station, eNB or other such network device may be performed by processing circuitry 870 executing instructions stored on device readable medium 880 or memory within processing circuitry 870. In alternative embodiments, some or all of the functionality may be provided by processing circuitry 870 without executing instructions stored on a separate or discrete device readable medium, such as in a hard-wired manner. In any of those embodiments, whether executing instructions stored on a device readable storage medium or not, processing circuitry 870 can be configured to perform the described functionality. The benefits provided by such functionality are not limited to processing circuitry 870 alone or to other components of network node 860, but are enjoyed by network node 860 as a whole, and/or by end users and the wireless network generally.

Device readable medium 880 may comprise any form of volatile or non-volatile computer readable memory including, without limitation, persistent storage, solid-state memory, remotely mounted memory, magnetic media, optical media, RAM, Read Only Memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 870. Device readable medium 880 may store any suitable instructions, data or information, including a computer program, software, an application including one or more of logic, rules, code, tables, etc. and/or other instructions capable of being executed by processing circuitry 870 and, utilized by network node 860. Device readable medium 880 may be used to store any calculations made by processing circuitry 870 and/or any data received via interface 890. In some embodiments, processing circuitry 870 and device readable medium 880 may be considered to be integrated.

Interface 890 is used in the wired or wireless communication of signaling and/or data between network node 860, network 806, and/or WDs 810. As illustrated, interface 890 comprises port(s)/terminal(s) 894 to send and receive data, for example to and from network 806 over a wired connection. Interface 890 also includes radio front end circuitry 892 that may be coupled to, or in certain embodiments a part of, antenna 862. Radio front end circuitry 892 comprises filters 898 and amplifiers 896. Radio front end circuitry 892 may be connected to antenna 862 and processing circuitry 870. Radio front end circuitry may be configured to condition signals communicated between antenna 862 and processing circuitry 870. Radio front end circuitry 892 may receive digital data that is to be sent out to other network nodes or WDs via a wireless connection. Radio front end circuitry 892 may convert the digital data into a radio signal having the appropriate channel and bandwidth parameters using a combination of filters 898 and/or amplifiers 896. The radio signal may then be transmitted via antenna 862. Similarly, when receiving data, antenna 862 may collect radio signals which are then converted into digital data by radio front end circuitry 892. The digital data may be passed to processing circuitry 870. In other embodiments, the interface may comprise different components and/or different combinations of components.

In certain alternative embodiments, network node 860 may not include separate radio front end circuitry 892; instead, processing circuitry 870 may comprise radio front end circuitry and may be connected to antenna 862 without separate radio front end circuitry 892. Similarly, in some embodiments, all or some of RF transceiver circuitry 872 may be considered a part of interface 890. In still other embodiments, interface 890 may include one or more ports or terminals 894, radio front end circuitry 892, and RF transceiver circuitry 872, as part of a radio unit (not shown), and interface 890 may communicate with baseband processing circuitry 874, which is part of a digital unit (not shown).

Antenna 862 may include one or more antennas, or antenna arrays, configured to send and/or receive wireless signals. Antenna 862 may be coupled to radio front end circuitry 890 and may be any type of antenna capable of transmitting and receiving data and/or signals wirelessly. In some embodiments, antenna 862 may comprise one or more omni-directional, sector or panel antennas operable to transmit/receive radio signals between, for example, 2 gigahertz (GHz) and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as Multiple Input Multiple Output (MIMO). In certain embodiments, antenna 862 may be separate from network node 860 and may be connectable to network node 860 through an interface or port.

Antenna 862, interface 890, and/or processing circuitry 870 may be configured to perform any receiving operations and/or certain obtaining operations described herein as being performed by a network node. Any information, data, and/or signals may be received from a wireless device, another network node, and/or any other network equipment. Similarly, antenna 862, interface 890, and/or processing circuitry 870 may be configured to perform any transmitting operations described herein as being performed by a network node. Any information, data, and/or signals may be transmitted to a wireless device, another network node, and/or any other network equipment.

Power circuitry 887 may comprise, or be coupled to, power management circuitry and is configured to supply the components of network node 860 with power for performing the functionality described herein. Power circuitry 887 may receive power from power source 886. Power source 886 and/or power circuitry 887 may be configured to provide power to the various components of network node 860 in a form suitable for the respective components (e.g., at a voltage and current level needed for each respective component). Power source 886 may either be included in, or external to, power circuitry 887 and/or network node 860. For example, network node 860 may be connectable to an external power source (e.g., an electricity outlet) via an input circuitry or interface such as an electrical cable, whereby the external power source supplies power to power circuitry 887. As a further example, power source 886 may comprise a source of power in the form of a battery or battery pack which is connected to, or integrated in, power circuitry 887. The battery may provide backup power should the external power source fail. Other types of power sources, such as photovoltaic devices, may also be used.

Alternative embodiments of network node 860 may include additional components beyond those shown in FIG. 8 that may be responsible for providing certain aspects of the network node's functionality, including any of the functionality described herein and/or any functionality necessary to support the subject matter described herein. For example, network node 860 may include user interface equipment to allow input of information into network node 860 and to allow output of information from network node 860. This may allow a user to perform diagnostic, maintenance, repair, and other administrative functions for network node 860.

As used herein, WD refers to a device capable, configured, arranged, and/or operable to communicate wirelessly with network nodes and/or other wireless devices. Unless otherwise noted, the term WD may be used interchangeably herein with UE. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a Voice over Internet Protocol (IP) (VoIP) phone, a wireless local loop phone, a desktop computer, a Personal Digital Assistant (PDA), a wireless cameras, a gaming console or device, a music storage device, a playback appliance, a wearable terminal device, a wireless endpoint, a mobile station, a tablet, a laptop, Laptop Embedded Equipment (LEE), Laptop Mounted Equipment (LME), a smart device, a wireless Customer Premise Equipment (CPE), a vehicle-mounted wireless terminal device, etc. A WD may support Device-to-Device (D2D) communication, for example by implementing a 3GPP standard for sidelink communication, and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a Machine-to-Machine (M2M) device, which may in a 3GPP context be referred to as a Machine Type Communication (MTC) device. As one particular example, the WD may be a UE implementing the 3GPP Narrowband IoT (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 810 includes antenna 811, interface 814, processing circuitry 820, device readable medium 830, user interface equipment 832, auxiliary equipment 834, power source 836, and power circuitry 837. WD 810 may include multiple sets of one or more of the illustrated components for different wireless technologies supported by WD 810, such as, for example, GSM, WCDMA, LTE, NR, WiFi, WiMAX, or Bluetooth wireless technologies, just to mention a few. These wireless technologies may be integrated into the same or different chips or set of chips as other components within WD 810.

Antenna 811 may include one or more antennas or antenna arrays, configured to send and/or receive wireless signals, and is connected to interface 814. In certain alternative embodiments, antenna 811 may be separate from WD 810 and be connectable to WD 810 through an interface or port. Antenna 811, interface 814, and/or processing circuitry 820 may be configured to perform any receiving or transmitting operations described herein as being performed by a WD. Any information, data, and/or signals may be received from a network node and/or another WD. In some embodiments, radio front end circuitry and/or antenna 811 may be considered an interface.

As illustrated, interface 814 comprises radio front end circuitry 812 and antenna 811. Radio front end circuitry 812 comprises one or more filters 818 and amplifiers 816. Radio front end circuitry 814 is connected to antenna 811 and processing circuitry 820, and is configured to condition signals communicated between antenna 811 and processing circuitry 820. Radio front end circuitry 812 may be coupled to or a part of antenna 811. In some embodiments, WD 810 may not include separate radio front end circuitry 812; rather, processing circuitry 820 may comprise radio front end circuitry and may be connected to antenna 811. Similarly, in some embodiments, some or all of RF transceiver circuitry 822 may be considered a part of interface 814. Radio front end circuitry 812 may receive digital data that is to be sent out to other network nodes or WDs via a wireless connection. Radio front end circuitry 812 may convert the digital data into a radio signal having the appropriate channel and bandwidth parameters using a combination of filters 818 and/or amplifiers 816. The radio signal may then be transmitted via antenna 811. Similarly, when receiving data, antenna 811 may collect radio signals which are then converted into digital data by radio front end circuitry 812. The digital data may be passed to processing circuitry 820. In other embodiments, the interface may comprise different components and/or different combinations of components.

Processing circuitry 820 may comprise a combination of one or more of a microprocessor, controller, microcontroller, CPU, DSP, ASIC, FPGA, or any other suitable computing device, resource, or combination of hardware, software, and/or encoded logic operable to provide, either alone or in conjunction with other WD 810 components, such as device readable medium 830, WD 810 functionality. Such functionality may include providing any of the various wireless features or benefits discussed herein. For example, processing circuitry 820 may execute instructions stored in device readable medium 830 or in memory within processing circuitry 820 to provide the functionality disclosed herein.

As illustrated, processing circuitry 820 includes one or more of RF transceiver circuitry 822, baseband processing circuitry 824, and application processing circuitry 826. In other embodiments, the processing circuitry may comprise different components and/or different combinations of components. In certain embodiments processing circuitry 820 of WD 810 may comprise a SOC. In some embodiments, RF transceiver circuitry 822, baseband processing circuitry 824, and application processing circuitry 826 may be on separate chips or sets of chips. In alternative embodiments, part or all of baseband processing circuitry 824 and application processing circuitry 826 may be combined into one chip or set of chips, and RF transceiver circuitry 822 may be on a separate chip or set of chips. In still alternative embodiments, part or all of RF transceiver circuitry 822 and baseband processing circuitry 824 may be on the same chip or set of chips, and application processing circuitry 826 may be on a separate chip or set of chips. In yet other alternative embodiments, part or all of RF transceiver circuitry 822, baseband processing circuitry 824, and application processing circuitry 826 may be combined in the same chip or set of chips. In some embodiments, RF transceiver circuitry 822 may be a part of interface 814. RF transceiver circuitry 822 may condition RF signals for processing circuitry 820.

In certain embodiments, some or all of the functionality described herein as being performed by a WD may be provided by processing circuitry 820 executing instructions stored on device readable medium 830, which in certain embodiments may be a computer-readable storage medium. In alternative embodiments, some or all of the functionality may be provided by processing circuitry 820 without executing instructions stored on a separate or discrete device readable storage medium, such as in a hard-wired manner. In any of those particular embodiments, whether executing instructions stored on a device readable storage medium or not, processing circuitry 820 can be configured to perform the described functionality. The benefits provided by such functionality are not limited to processing circuitry 820 alone or to other components of WD 810, but are enjoyed by WD 810 as a whole, and/or by end users and the wireless network generally.

Processing circuitry 820 may be configured to perform any determining, calculating, or similar operations (e.g., certain obtaining operations) described herein as being performed by a WD. These operations, as performed by processing circuitry 820, may include processing information obtained by processing circuitry 820 by, for example, converting the obtained information into other information, comparing the obtained information or converted information to information stored by WD 810, and/or performing one or more operations based on the obtained information or converted information, and as a result of said processing making a determination.

Device readable medium 830 may be operable to store a computer program, software, an application including one or more of logic, rules, code, tables, etc. and/or other instructions capable of being executed by processing circuitry 820. Device readable medium 830 may include computer memory (e.g., RAM or ROM), mass storage media (e.g., a hard disk), removable storage media (e.g., a CD or a DVD), and/or any other volatile or non-volatile, non-transitory device readable and/or computer executable memory devices that store information, data, and/or instructions that may be used by processing circuitry 820. In some embodiments, processing circuitry 820 and device readable medium 830 may be considered to be integrated.

User interface equipment 832 may provide components that allow for a human user to interact with WD 810. Such interaction may be of many forms, such as visual, audial, tactile, etc. User interface equipment 832 may be operable to produce output to the user and to allow the user to provide input to WD 810. The type of interaction may vary depending on the type of user interface equipment 832 installed in WD 810. For example, if WD 810 is a smart phone, the interaction may be via a touch screen; if WD 810 is a smart meter, the interaction may be through a screen that provides usage (e.g., the number of gallons used) or a speaker that provides an audible alert (e.g., if smoke is detected). User interface equipment 832 may include input interfaces, devices and circuits, and output interfaces, devices and circuits. User interface equipment 832 is configured to allow input of information into WD 810, and is connected to processing circuitry 820 to allow processing circuitry 820 to process the input information. User interface equipment 832 may include, for example, a microphone, a proximity or other sensor, keys/buttons, a touch display, one or more cameras, a Universal Serial Bus (USB) port, or other input circuitry. User interface equipment 832 is also configured to allow output of information from WD 810, and to allow processing circuitry 820 to output information from WD 810. User interface equipment 832 may include, for example, a speaker, a display, vibrating circuitry, a USB port, a headphone interface, or other output circuitry. Using one or more input and output interfaces, devices, and circuits, of user interface equipment 832, WD 810 may communicate with end users and/or the wireless network, and allow them to benefit from the functionality described herein.

Auxiliary equipment 834 is operable to provide more specific functionality which may not be generally performed by WDs. This may comprise specialized sensors for doing measurements for various purposes, interfaces for additional types of communication such as wired communications etc. The inclusion and type of components of auxiliary equipment 834 may vary depending on the embodiment and/or scenario.

Power source 836 may, in some embodiments, be in the form of a battery or battery pack. Other types of power sources, such as an external power source (e.g., an electricity outlet), photovoltaic devices or power cells, may also be used. WD 810 may further comprise power circuitry 837 for delivering power from power source 836 to the various parts of WD 810 which need power from power source 836 to carry out any functionality described or indicated herein. Power circuitry 837 may in certain embodiments comprise power management circuitry. Power circuitry 837 may additionally or alternatively be operable to receive power from an external power source; in which case WD 810 may be connectable to the external power source (such as an electricity outlet) via input circuitry or an interface such as an electrical power cable. Power circuitry 837 may also in certain embodiments be operable to deliver power from an external power source to power source 836. This may be, for example, for the charging of power source 836. Power circuitry 837 may perform any formatting, converting, or other modification to the power from power source 836 to make the power suitable for the respective components of WD 810 to which power is supplied.

Figure 9:
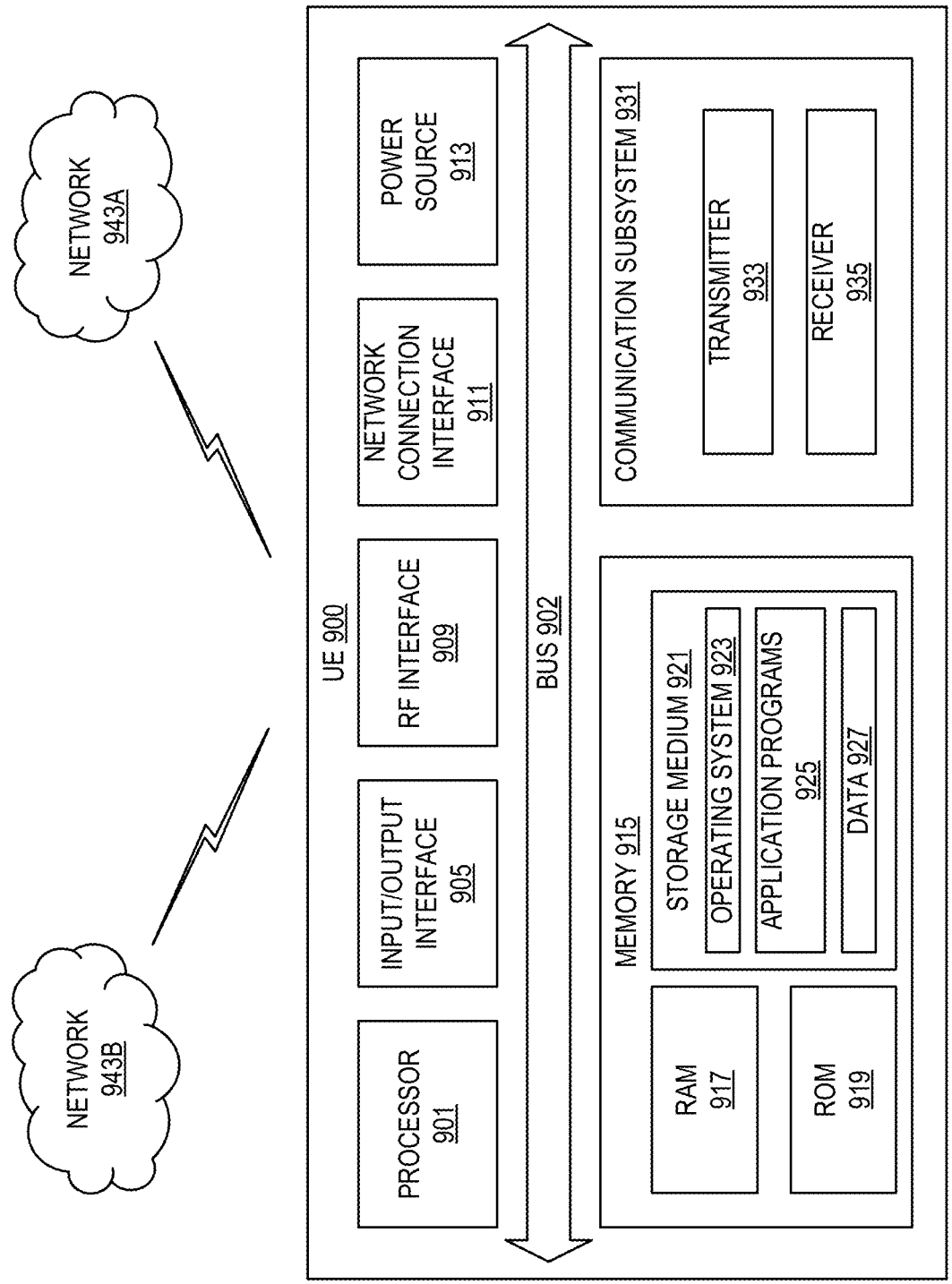
FIG. 9 illustrates a UE in accordance with some embodiments.

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user. A UE may also comprise any UE identified by the 3GPP, including a NB-IoT UE that is not intended for sale to, or operation by, a human user. UE 900, as illustrated in FIG. 9, is one example of a WD configured for communication in accordance with one or more communication standards promulgated by the 3GPP, such as 3GPP's GSM, UMTS, LTE, and/or 5G standards. As mentioned previously, the term WD and UE may be used interchangeably. Accordingly, although FIG. 9 is a UE, the components discussed herein are equally applicable to a WD, and vice-versa.

In FIG. 9, UE 900 includes processing circuitry 901 that is operatively coupled to input/output interface 905, RF interface 909, network connection interface 911, memory 915 including RAM 917, ROM 919, and storage medium 921 or the like, communication subsystem 931, power source 933, and/or any other component, or any combination thereof. Storage medium 921 includes operating system 923, application program 925, and data 927. In other embodiments, storage medium 921 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 901 may be configured to process computer instructions and data. Processing circuitry 901 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or DSP, together with appropriate software; or any combination of the above. For example, the processing circuitry 901 may include two CPUs. Data may be information in a form suitable for use by a computer.

In the depicted embodiment, input/output interface 905 may be configured to provide a communication interface to an input device, output device, or input and output device. UE 900 may be configured to use an output device via input/output interface 905. An output device may use the same type of interface port as an input device. For example, a USB port may be used to provide input to and output from UE 900. The output device may be a speaker, a sound card, a video card, a display, a monitor, a printer, an actuator, an emitter, a smartcard, another output device, or any combination thereof. UE 900 may be configured to use an input device via input/output interface 905 to allow a user to capture information into UE 900. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 909 may be configured to provide a communication interface to RF components such as a transmitter, a receiver, and an antenna. Network connection interface 911 may be configured to provide a communication interface to network 943a. Network 943a may encompass wired and/or wireless networks such as a LAN, a WAN, a computer network, a wireless network, a telecommunications network, another like network or any combination thereof. For example, network 943a may comprise a WiFi network. Network connection interface 911 may be configured to include a receiver and a transmitter interface used to communicate with one or more other devices over a communication network according to one or more communication protocols, such as Ethernet, Transmission Control Protocol (TCP)/IP, Synchronous Optical Networking (SONET), Asynchronous Transfer Mode (ATM), or the like. Network connection interface 911 may implement receiver and transmitter functionality appropriate to the communication network links (e.g., optical, electrical, and the like). The transmitter and receiver functions may share circuit components, software or firmware, or alternatively may be implemented separately.

RAM 917 may be configured to interface via bus 902 to processing circuitry 901 to provide storage or caching of data or computer instructions during the execution of software programs such as the operating system, application programs, and device drivers. ROM 919 may be configured to provide computer instructions or data to processing circuitry 901. For example, ROM 919 may be configured to store invariant low-level system code or data for basic system functions such as basic Input and Output (1/O), startup, or reception of keystrokes from a keyboard that are stored in a non-volatile memory. Storage medium 921 may be configured to include memory such as RAM, ROM, Programmable ROM (PROM), Erasable PROM (EPROM), Electrically EPROM (EEPROM), magnetic disks, optical disks, floppy disks, hard disks, removable cartridges, or flash drives. In one example, storage medium 921 may be configured to include operating system 923, application program 925 such as a web browser application, a widget or gadget engine or another application, and data file 927. Storage medium 921 may store, for use by UE 900, any of a variety of various operating systems or combinations of operating systems.

Storage medium 921 may be configured to include a number of physical drive units, such as Redundant Array of Independent Disks (RAID), floppy disk drive, flash memory, USB flash drive, external hard disk drive, thumb drive, pen drive, key drive, High-Density DVD (HD-DVD) optical disc drive, internal hard disk drive, Blu-Ray optical disc drive, Holographic Digital Data Storage (HDDS) optical disc drive, external mini-Dual In-line Memory Module (DIMM), Synchronous Dynamic RAM (SDRAM), external micro-DIMM SDRAM, smartcard memory such as a Subscriber Identity Module (SIM) or a Removable User Identity (RUIM) module, other memory, or any combination thereof. Storage medium 921 may allow UE 900 to access computer-executable instructions, application programs or the like, stored on transitory or non-transitory memory media, to off-load data, or to upload data. An article of manufacture, such as one utilizing a communication system may be tangibly embodied in storage medium 921, which may comprise a device readable medium.

In FIG. 9, processing circuitry 901 may be configured to communicate with network 943b using communication subsystem 931. Network 943a and network 943b may be the same network or networks or different network or networks. Communication subsystem 931 may be configured to include one or more transceivers used to communicate with network 943b. For example, communication subsystem 931 may be configured to include one or more transceivers used to communicate with one or more remote transceivers of another device capable of wireless communication such as another WD, UE, or base station of a Radio Access Network (RAN) according to one or more communication protocols, such as IEEE 802.8, Code Division Multiple Access (CDMA), WCDMA, GSM, LTE, Universal Terrestrial Radio Access Network (UTRAN), WiMax, or the like. Each transceiver may include transmitter 933 and/or receiver 935 to implement transmitter or receiver functionality, respectively, appropriate to the RAN links (e.g., frequency allocations and the like). Further, transmitter 933 and receiver 935 of each transceiver may share circuit components, software or firmware, or alternatively may be implemented separately.

In the illustrated embodiment, the communication functions of communication subsystem 931 may include data communication, voice communication, multimedia communication, short-range communications such as Bluetooth, near-field communication, location-based communication such as the use of the Global Positioning System (GPS) to determine a location, another like communication function, or any combination thereof. For example, communication subsystem 931 may include cellular communication, WiFi communication, Bluetooth communication, and GPS communication. Network 943b may encompass wired and/or wireless networks such as a LAN, a WAN, a computer network, a wireless network, a telecommunications network, another like network or any combination thereof. For example, network 943b may be a cellular network, a WiFi network, and/or a near-field network. Power source 913 may be configured to provide Alternating Current (AC) or Direct Current (DC) power to components of UE 900.

The features, benefits, and/or functions described herein may be implemented in one of the components of UE 900 or partitioned across multiple components of UE 900. Further, the features, benefits, and/or functions described herein may be implemented in any combination of hardware, software, or firmware. In one example, communication subsystem 931 may be configured to include any of the components described herein. Further, processing circuitry 901 may be configured to communicate with any of such components over bus 902. In another example, any of such components may be represented by program instructions stored in memory that when executed by processing circuitry 901 perform the corresponding functions described herein. In another example, the functionality of any of such components may be partitioned between processing circuitry 901 and communication subsystem 931. In another example, the non-computationally intensive functions of any of such components may be implemented in software or firmware and the computationally intensive functions may be implemented in hardware.

Figure 10:
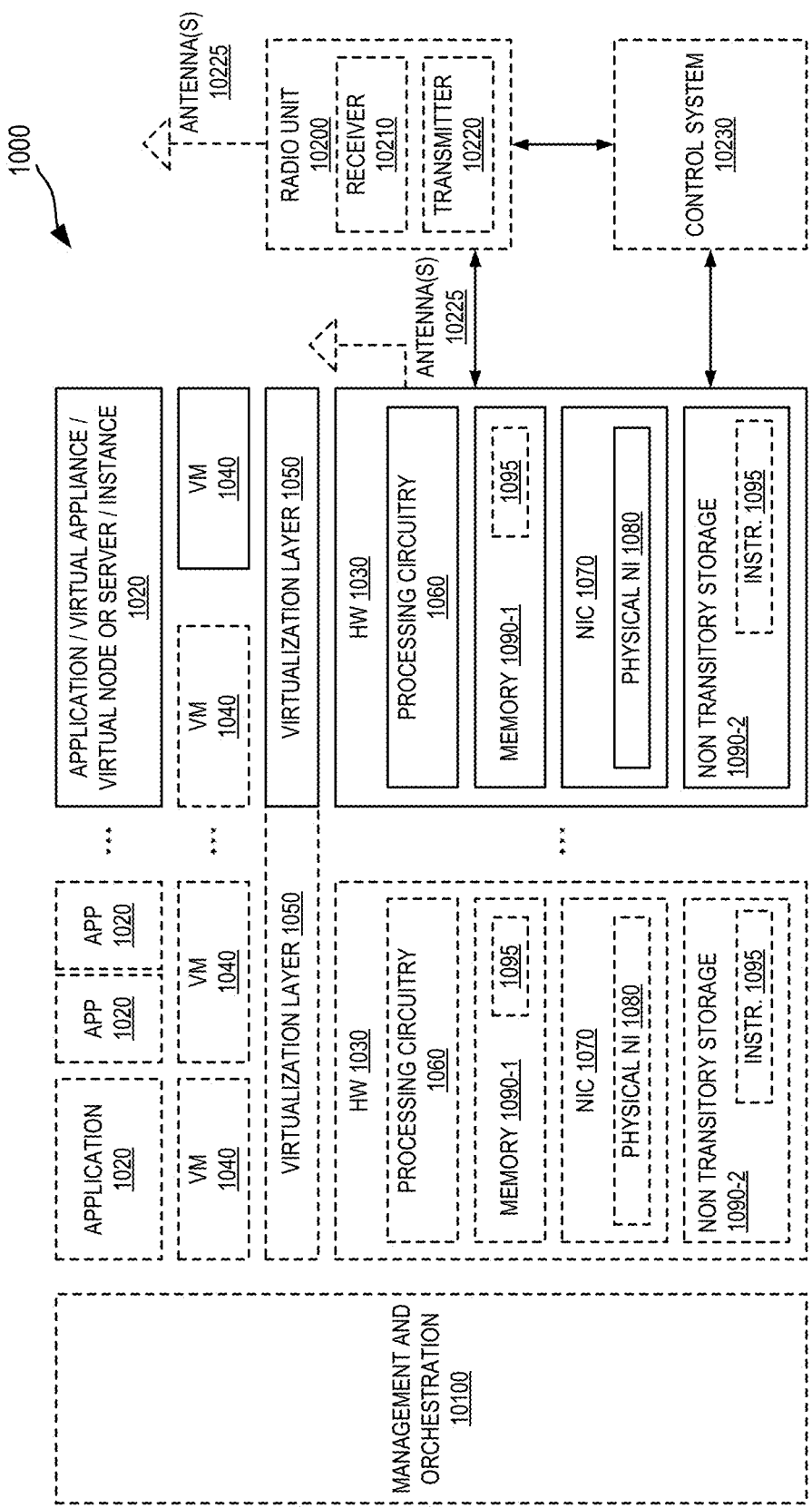
FIG. 10 illustrates a virtualization environment in accordance with some embodiments.

FIG. 10 is a schematic block diagram illustrating a virtualization environment 1000 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines, or containers executing on one or more physical processing nodes in one or more networks).

In some embodiments, some or all of the functions described herein may be implemented as virtual components executed by one or more virtual machines implemented in one or more virtual environments 1000 hosted by one or more of hardware nodes 1030. Further, in embodiments in which the virtual node is not a radio access node or does not require radio connectivity (e.g., a core network node), then the network node may be entirely virtualized.

The functions may be implemented by one or more applications 1020 (which may alternatively be called software instances, virtual appliances, network functions, virtual nodes, virtual network functions, etc.) operative to implement some of the features, functions, and/or benefits of some of the embodiments disclosed herein. Applications 1020 are run in virtualization environment 1000 which provides hardware 1030 comprising processing circuitry 1060 and memory 1090. Memory 1090 contains instructions 1095 executable by processing circuitry 1060 whereby application 1020 is operative to provide one or more of the features, benefits, and/or functions disclosed herein.

Virtualization environment 1000, comprises general-purpose or special-purpose network hardware devices 1030 comprising a set of one or more processors or processing circuitry 1060, which may be Commercial Off-the-Shelf (COTS) processors, dedicated ASICs, or any other type of processing circuitry including digital or analog hardware components or special purpose processors. Each hardware device may comprise memory 1090-1 which may be non-persistent memory for temporarily storing instructions 1095 or software executed by processing circuitry 1060. Each hardware device may comprise one or more Network Interface Controllers (NICs) 1070, also known as network interface cards, which include physical network interface 1080. Each hardware device may also include non-transitory, persistent, machine-readable storage media 1090-2 having stored therein software 1095 and/or instructions executable by processing circuitry 1060. Software 1095 may include any type of software including software for instantiating one or more virtualization layers 1050 (also referred to as hypervisors), software to execute virtual machines 1040 as well as software allowing it to execute functions, features and/or benefits described in relation with some embodiments described herein.

Virtual machines 1040, comprise virtual processing, virtual memory, virtual networking or interface and virtual storage, and may be run by a corresponding virtualization layer 1050 or hypervisor. Different embodiments of the instance of virtual appliance 1020 may be implemented on one or more of virtual machines 1040, and the implementations may be made in different ways.

During operation, processing circuitry 1060 executes software 1095 to instantiate the hypervisor or virtualization layer 1050, which may sometimes be referred to as a Virtual Machine Monitor (VMM). Virtualization layer 1050 may present a virtual operating platform that appears like networking hardware to virtual machine 1040.

As shown in FIG. 10, hardware 1030 may be a standalone network node with generic or specific components. Hardware 1030 may comprise antenna 10225 and may implement some functions via virtualization. Alternatively, hardware 1030 may be part of a larger cluster of hardware (e.g., such as in a data center or CPE) where many hardware nodes work together and are managed via Management and Orchestration (MANO) 10100, which, among others, oversees lifecycle management of applications 1020.

Virtualization of the hardware is in some contexts referred to as Network Function Virtualization (NFV). NFV may be used to consolidate many network equipment types onto industry standard high volume server hardware, physical switches, and physical storage, which can be located in data centers, and CPE.

In the context of NFV, virtual machine 1040 may be a software implementation of a physical machine that runs programs as if they were executing on a physical, non-virtualized machine. Each of virtual machines 1040, and that part of hardware 1030 that executes that virtual machine, be it hardware dedicated to that virtual machine and/or hardware shared by that virtual machine with others of the virtual machines 1040, forms a separate Virtual Network Element (VNE).

Still in the context of NFV, Virtual Network Function (VNF) is responsible for handling specific network functions that run in one or more virtual machines 1040 on top of hardware networking infrastructure 1030 and corresponds to application 1020 in FIG. 10.

In some embodiments, one or more radio units 10200 that each include one or more transmitters 10220 and one or more receivers 10210 may be coupled to one or more antennas 10225. Radio units 10200 may communicate directly with hardware nodes 1030 via one or more appropriate network interfaces and may be used in combination with the virtual components to provide a virtual node with radio capabilities, such as a radio access node or a base station.

In some embodiments, some signaling can be effected with the use of control system 10230 which may alternatively be used for communication between the hardware nodes 1030 and radio units 10200.

Figure 11:
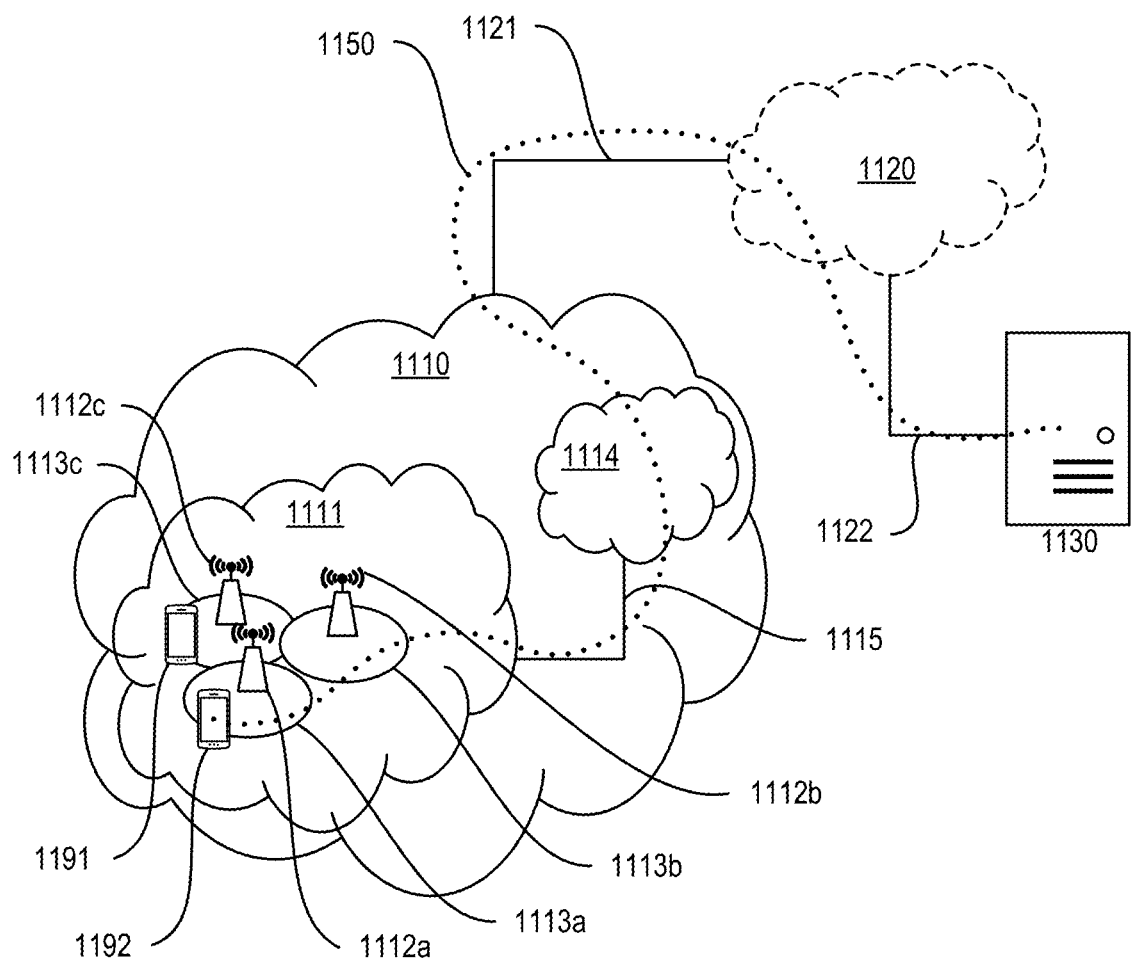
FIG. 11 illustrates a telecommunication network connected via an intermediate network to a host computer in accordance with some embodiments.

With reference to FIG. 11, in accordance with an embodiment, a communication system includes telecommunication network 1110, such as a 3GPP-type cellular network, which comprises access network 1111, such as a radio access network, and core network 1114. Access network 1111 comprises a plurality of base stations 1112a, 1112b, 1112c, such as Node Bs, eNBs, gNBs or other types of wireless access points, each defining a corresponding coverage area 1113a, 1113b, 1113c. Each base station 1112a, 1112b, 1112c is connectable to core network 1114 over a wired or wireless connection 1115. A first UE 1191 located in coverage area 1113c is configured to wirelessly connect to, or be paged by, the corresponding base station 1112c. A second UE 1192 in coverage area 1113a is wirelessly connectable to the corresponding base station 1112a. While a plurality of UEs 1191, 1192 are illustrated in this example, the disclosed embodiments are equally applicable to a situation where a sole UE is in the coverage area or where a sole UE is connecting to the corresponding base station 1112.

Telecommunication network 1110 is itself connected to host computer 1130, which may be embodied in the hardware and/or software of a standalone server, a cloud-implemented server, a distributed server or as processing resources in a server farm. Host computer 1130 may be under the ownership or control of a service provider, or may be operated by the service provider or on behalf of the service provider. Connections 1121 and 1122 between telecommunication network 1110 and host computer 1130 may extend directly from core network 1114 to host computer 1130 or may go via an optional intermediate network 1120. Intermediate network 1120 may be one of, or a combination of more than one of, a public, private, or hosted network; intermediate network 1120, if any, may be a backbone network or the Internet; in particular, intermediate network 1120 may comprise two or more sub-networks (not shown).

The communication system of FIG. 11 as a whole enables connectivity between the connected UEs 1191, 1192 and host computer 1130. The connectivity may be described as an Over-the-Top (OTT) connection 1150. Host computer 1130 and the connected UEs 1191, 1192 are configured to communicate data and/or signaling via OTT connection 1150, using access network 1111, core network 1114, any intermediate network 1120 and possible further infrastructure (not shown) as intermediaries. OTT connection 1150 may be transparent in the sense that the participating communication devices through which OTT connection 1150 passes are unaware of routing of uplink and downlink communications. For example, base station 1112 may not or need not be informed about the past routing of an incoming downlink communication with data originating from host computer 1130 to be forwarded (e.g., handed over) to a connected UE 1191. Similarly, base station 1112 need not be aware of the future routing of an outgoing uplink communication originating from the UE 1191 towards the host computer 1130.

Example implementations, in accordance with an embodiment, of the UE, base station and host computer discussed in the preceding paragraphs will now be described with reference to FIG. 12. In communication system 1200, host computer 1210 comprises hardware 1215 including communication interface 1216 configured to set up and maintain a wired or wireless connection with an interface of a different communication device of communication system 1200. Host computer 1210 further comprises processing circuitry 1218, which may have storage and/or processing capabilities. In particular, processing circuitry 1218 may comprise one or more programmable processors, ASICs, FPGAs, or combinations of these (not shown) adapted to execute instructions. Host computer 1210 further comprises software 1211, which is stored in or accessible by host computer 1210 and executable by processing circuitry 1218. Software 1211 includes host application 1212. Host application 1212 may be operable to provide a service to a remote user, such as UE 1230 connecting via OTT connection 1250 terminating at UE 1230 and host computer 1210. In providing the service to the remote user, host application 1212 may provide user data which is transmitted using OTT connection 1250.

Communication system 1200 further includes base station 1220 provided in a telecommunication system and comprising hardware 1225 enabling it to communicate with host computer 1210 and with UE 1230. Hardware 1225 may include communication interface 1226 for setting up and maintaining a wired or wireless connection with an interface of a different communication device of communication system 1200, as well as radio interface 1227 for setting up and maintaining at least wireless connection 1270 with UE 1230 located in a coverage area (not shown in FIG. 12) served by base station 1220. Communication interface 1226 may be configured to facilitate connection 1260 to host computer 1210. Connection 1260 may be direct or it may pass through a core network (not shown in FIG. 12) of the telecommunication system and/or through one or more intermediate networks outside the telecommunication system. In the embodiment shown, hardware 1225 of base station 1220 further includes processing circuitry 1228, which may comprise one or more programmable processors, ASICs, FPGAs, or combinations of these (not shown) adapted to execute instructions. Base station 1220 further has software 1221 stored internally or accessible via an external connection.

Communication system 1200 further includes UE 1230 already referred to. Its hardware 1235 may include radio interface 1237 configured to set up and maintain wireless connection 1270 with a base station serving a coverage area in which UE 1230 is currently located. Hardware 1235 of UE 1230 further includes processing circuitry 1238, which may comprise one or more programmable processors, ASICs, FPGAs, or combinations of these (not shown) adapted to execute instructions. UE 1230 further comprises software 1231, which is stored in or accessible by UE 1230 and executable by processing circuitry 1238. Software 1231 includes client application 1232. Client application 1232 may be operable to provide a service to a human or non-human user via UE 1230, with the support of host computer 1210. In host computer 1210, an executing host application 1212 may communicate with the executing client application 1232 via OTT connection 1250 terminating at UE 1230 and host computer 1210. In providing the service to the user, client application 1232 may receive request data from host application 1212 and provide user data in response to the request data. OTT connection 1250 may transfer both the request data and the user data. Client application 1232 may interact with the user to generate the user data that it provides.

Figure 12:
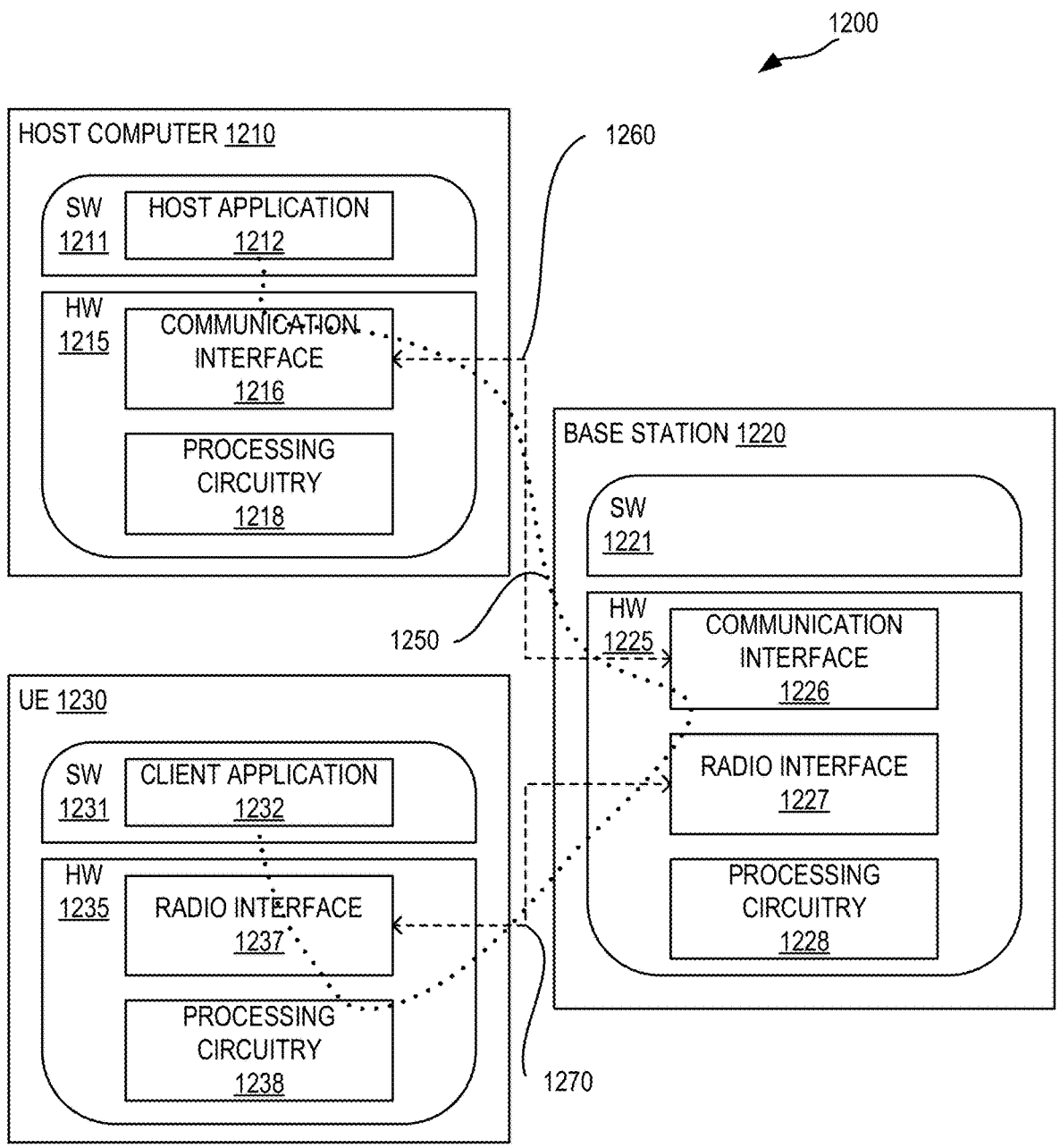
FIG. 12 illustrates a host computer communicating via a base station with a UE over a partially wireless connection in accordance with some embodiments.

It is noted that host computer 1210, base station 1220 and UE 1230 illustrated in FIG. 12 may be similar or identical to host computer 1130, one of base stations 1112a, 1112b, 1112c and one of UEs 1191, 1192 of FIG. 11, respectively. This is to say, the inner workings of these entities may be as shown in FIG. 12 and independently, the surrounding network topology may be that of FIG. 11.

In FIG. 12, OTT connection 1250 has been drawn abstractly to illustrate the communication between host computer 1210 and UE 1230 via base station 1220, without explicit reference to any intermediary devices and the precise routing of messages via these devices. Network infrastructure may determine the routing, which it may be configured to hide from UE 1230 or from the service provider operating host computer 1210, or both. While OTT connection 1250 is active, the network infrastructure may further take decisions by which it dynamically changes the routing (e.g., on the basis of load balancing consideration or reconfiguration of the network).

Wireless connection 1270 between UE 1230 and base station 1220 is in accordance with the teachings of the embodiments described throughout this disclosure. One or more of the various embodiments improve the performance of OTT services provided to UE 1230 using OTT connection 1250, in which wireless connection 1270 forms the last segment. More precisely, the teachings of these embodiments may improve the data rate, latency, and power consumption, and thereby provide benefits such as e.g., reduced user waiting time, better responsiveness, and extended battery lifetime.

A measurement procedure may be provided for the purpose of monitoring data rate, latency and other factors on which the one or more embodiments improve. There may further be an optional network functionality for reconfiguring OTT connection 1250 between host computer 1210 and UE 1230, in response to variations in the measurement results. The measurement procedure and/or the network functionality for reconfiguring OTT connection 1250 may be implemented in software 1211 and hardware 1215 of host computer 1210 or in software 1231 and hardware 1235 of UE 1230, or both. In embodiments, sensors (not shown) may be deployed in or in association with communication devices through which OTT connection 1250 passes; the sensors may participate in the measurement procedure by supplying values of the monitored quantities exemplified above, or supplying values of other physical quantities from which software 1211, 1231 may compute or estimate the monitored quantities. The reconfiguring of OTT connection 1250 may include message format, retransmission settings, preferred routing etc.; the reconfiguring need not affect base station 1220, and it may be unknown or imperceptible to base station 1220. Such procedures and functionalities may be known and practiced in the art. In certain embodiments, measurements may involve proprietary UE signaling facilitating host computer 1210's measurements of throughput, propagation times, latency, and the like. The measurements may be implemented in that software 1211 and 1231 causes messages to be transmitted, in particular empty or 'dummy' messages, using OTT connection 1250 while it monitors propagation times, errors, etc.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In step 1310, the host computer provides user data. In substep 1311 (which may be optional) of step 1310, the host computer provides the user data by executing a host application. In step 1320, the host computer initiates a transmission carrying the user data to the UE. In step 1330 (which may be optional), the base station transmits to the UE the user data which was carried in the transmission that the host computer initiated, in accordance with the teachings of the embodiments described throughout this disclosure. In step 1340 (which may also be optional), the UE executes a client application associated with the host application executed by the host computer.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In step 1410 of the method, the host computer provides user data. In an optional substep (not shown) the host computer provides the user data by executing a host application. In step 1420, the host computer initiates a transmission carrying the user data to the UE. The transmission may pass via the base station, in accordance with the teachings of the embodiments described throughout this disclosure. In step 1430 (which may be optional), the UE receives the user data carried in the transmission.

Figures 15, 16:
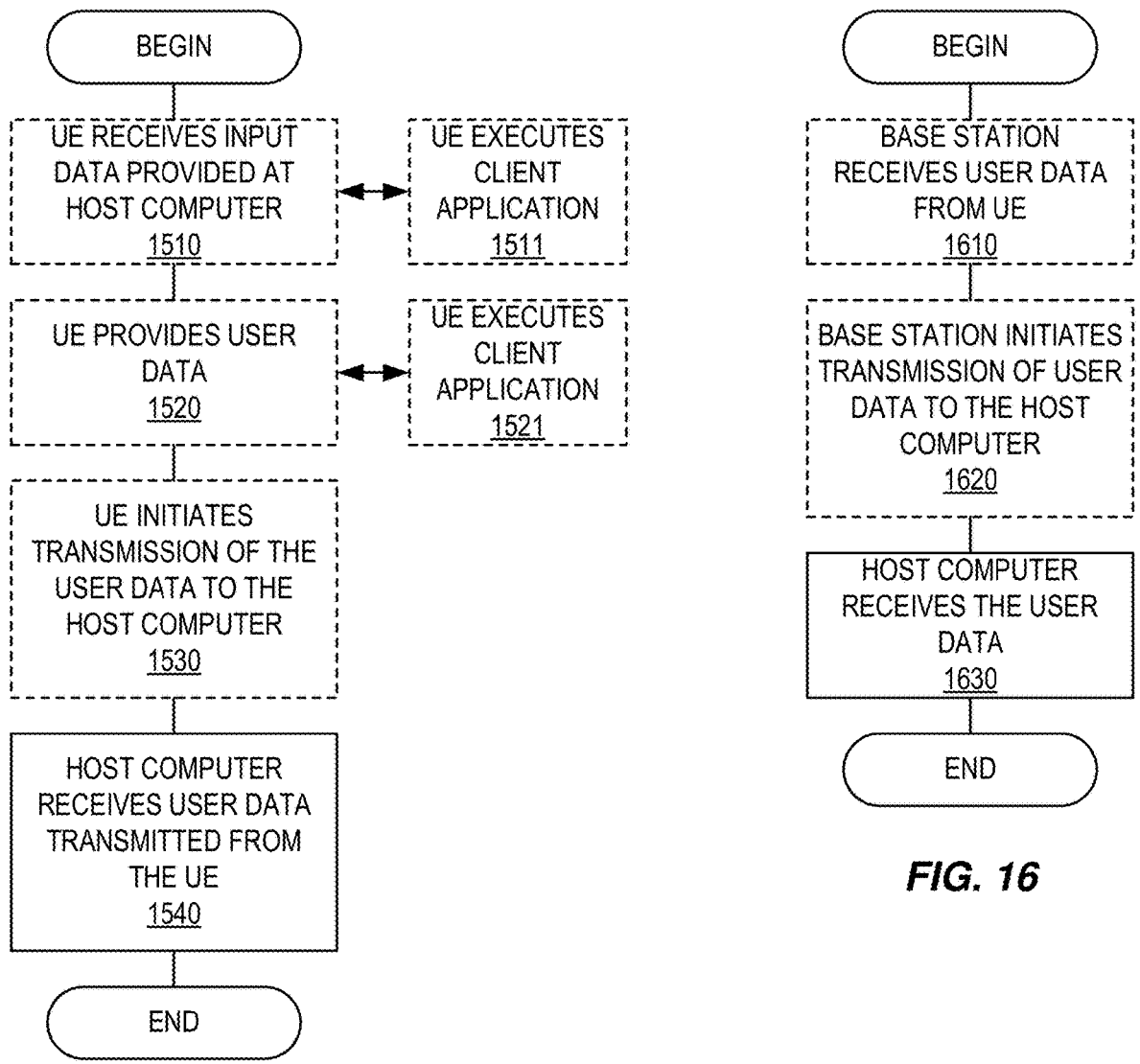
FIG. 15 illustrates methods implemented in a communication system including a host computer, a base station, and a UE in accordance with some embodiments.
FIG. 16 illustrates methods implemented in a communication system including a host computer, a base station, and a UE in accordance with some embodiments.

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In step 1510 (which may be optional), the UE receives input data provided by the host computer. Additionally or alternatively, in step 1520, the UE provides user data. In substep 1521 (which may be optional) of step 1520, the UE provides the user data by executing a client application. In substep 1511 (which may be optional) of step 1510, the UE executes a client application which provides the user data in reaction to the received input data provided by the host computer. In providing the user data, the executed client application may further consider user input received from the user. Regardless of the specific manner in which the user data was provided, the UE initiates, in substep 1530 (which may be optional), transmission of the user data to the host computer. In step 1540 of the method, the host computer receives the user data transmitted from the UE, in accordance with the teachings of the embodiments described throughout this disclosure.

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In step 1610 (which may be optional), in accordance with the teachings of the embodiments described throughout this disclosure, the base station receives user data from the UE. In step 1620 (which may be optional), the base station initiates transmission of the received user data to the host computer. In step 1630 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

2G Second Generation
3G Third Generation
3GPP Third Generation Partnership Project
4G Fourth Generation
5G Fifth Generation
AC Alternating Current
AP Access Point
ARFCN Absolute Radio Frequency Channel Number
ASIC Application Specific Integrated Circuit
ATM Asynchronous Transfer Mode
BS Base Station
BSC Base Station Controller
BTS Base Transceiver Station
CD Compact Disk
CDMA Code Division Multiple Access
COTS Commercial Off-the-Shelf
CPE Customer Premise Equipment
CPU Central Processing Unit
CQD Cell Quality Derivation
CSI-RS Channel State Information Reference Signal
D2D Device-to-Device
DAS Distributed Antenna System
DC Direct Current
DIMM Dual In-line Memory Module
DL Downlink
DSP Digital Signal Processor
DVD Digital Video Disk
EEPROM Electrically Erasable Programmable Read Only Memory
eNB Evolved Node B
EPROM Erasable Programmable Read Only Memory
E-SMLC Evolved Serving Mobile Location Center
FPGA Field Programmable Gate Array
GHz Gigahertz
gNB New Radio Base Station
GPS Global Positioning System
GSCN Global Synchronization Channel Number
GSM Global System for Mobile Communications
HDDS Holographic Digital Data Storage HD-DVD High-Density Digital Video Disk
IE Information Element
I/O Input and Output
IoT Internet of Things
IP Internet Protocol
kHz Kilohertz
LAN Local Area Network
LEE Laptop Embedded Equipment
LME Laptop Mounted Equipment
LTE Long Term Evolution
M2M Machine-to-Machine
MANO Management and Orchestration
MCE Multi-Cell/Multicast Coordination Entity
MDT Minimization of Drive Tests
MIMO Multiple Input Multiple Output
MME Mobility Management Entity
MO Measurement Object
ms Millisecond
MSC Mobile Switching Center
MSR Multi-Standard Radio
MTC Machine Type Communication
NB-IoT Narrowband Internet of Things
NFV Network Function Virtualization
NIC Network Interface Controller
NR New Radio
NR-PBCH New Radio Physical Broadcast Channel
NR-PSS New Radio Primary Synchronization Signal
NR-SSS New Radio Secondary Synchronization Signal
O&M Operation and Maintenance
OFDM Orthogonal Frequency Division Multiplexing
OSS Operations Support System
OTT Over-the-Top
PBCH Physical Broadcast Channel
PCell Primary Cell
PDA Personal Digital Assistant
PRB Physical Resource Block
PROM Programmable Read Only Memory
PSCell Primary Secondary Cell
PSTN Public Switched Telephone Network
RAID Redundant Array of Independent Disks
RAM Random Access Memory
RAN Radio Access Network
RAT Radio Access Technology
RF Radio Frequency
RNC Radio Network Controller
ROM Read Only Memory
RRC Radio Resource Control
RRH Remote Radio Head
RRM Radio Resource Management
RRU Remote Radio Unit
RS Reference Signal
RUIM Removable User Identity
SCell Secondary Cell
SDRAM Synchronous Dynamic Random Access Memory
SIM Subscriber Identity Module
SMTC SS/PBCH Block Measurement Time Configuration
SOC System on a Chip
SON Self-Organizing Network
SONET Synchronous Optical Networking
SS Synchronization Signal
SSB Synchronization Signal/Physical Broadcast Channel Block
TS Technical Specification
UE User Equipment
UMTS Universal Mobile Telecommunications System
USB Universal Serial Bus
UTRAN Universal Terrestrial Radio Access Network
VMM Virtual Machine Monitor
VNE Virtual Network Element
VNF Virtual Network Function
VoIP Voice over Internet Protocol
WAN Wide Area Network
WCDMA Wideband Code Division Multiple Access
WD Wireless Device
WiMax Worldwide Interoperability for Microwave Access
WLAN Wireless Local Area Network Those skilled in the art will recognize improvements and modifications to the embodiments of the present disclosure. All such improvements and modifications are considered within the scope of the concepts disclosed herein.

What is claimed is:

1. A method of operation of a User Equipment (UE) to perform cell quality derivation in a wireless communication network, the method comprising:
    obtaining, via Radio Resource Control (RRC) signaling from a network node, a measurement configuration that includes a list of measurement objects, wherein the list of measurement objects includes a measurement object of a serving cell, the measurement object of the serving cell specifying a Synchronization Signal/Physical Broadcast Channel block (SS/PBCH block) frequency;
    obtaining a serving cell configuration of the serving cell, the serving cell configuration providing frequency information that specifies an absolute frequency of an SS/PBCH block to be used for the serving cell, wherein the absolute frequency of the SS/PBCH block to be used for the serving cell matches the SS/PBCH block frequency of the measurement object;
    obtaining parameters to perform cell quality derivation for the serving cell of the UE from the measurement object; and
    performing cell quality derivation for the serving cell based on the obtained parameters;
    wherein the parameters comprise an absolute threshold for a reference signal type.

2. The method of claim 1, wherein the parameters comprise a maximum number of beams to be averaged.

3. The method of claim 1, wherein the parameters comprise a beam consolidation threshold.

4. The method of claim 1, wherein the parameters comprise absThreshSS-BlocksConsolidation.

5. The method of claim 1, wherein the parameters comprise an absolute threshold for consolidation of measurement results per Synchronization Signal Block, SSB.

6. The method of claim 1, wherein the parameters comprise absThreshSS-BlocksConsolidation and nrofSS-BlocksToAverage, and performing cell quality derivation for the serving cell based on the obtained parameters comprises, for each cell measurement quantity to be derived based on SS/PBCH block:
    deriving each cell measurement quantity based on SS/PBCH block as a linear average of power values of a number of highest beam measurement quantity values above absThreshSS-BlocksConsolidation where a total number of averaged beams shall not exceed nrofSS-BlocksToAverage.

7. The method of claim 1, wherein the parameters comprise a threshold that defines beams to be reported.

8. The method of claim 1, wherein the parameters comprise a threshold that defines beams to be averaged with a best beam.

9. The method of claim 1, wherein the serving cell configuration comprises a ServingCellConfigCommon information element.

10. The method of claim 1, wherein the specified absolute frequency comprises an absoluteFrequencySSB parameter included in a FrequencyInfoDL information element of the serving cell configuration.

11. The method of claim 1, wherein the RRC signaling comprises an RRC Reconfiguration message.

12. The method of claim 1, wherein the measurement configuration comprises a MeasConfig information element.

13. The method of claim 1, wherein the measurement object comprises a MeasObjectNR information element.

14. A user equipment (UE) for performing cell quality derivation in a wireless communication network, the UE comprising:
    a non-transitory memory; and
    one or more hardware processors coupled to the non-transitory memory and configured to read instructions from the non-transitory memory to cause the UE to perform operations comprising:
        obtaining, via Radio Resource Control (RRC) signaling from a network node, a measurement configuration that includes a list of measurement objects, wherein the list of measurement objects includes a measurement object of a serving cell, the measurement object of the serving cell specifying a Synchronization Signal/Physical Broadcast Channel block (SS/PBCH block) frequency;
        obtaining a serving cell configuration of the serving cell, the serving cell configuration providing frequency information that specifies an absolute frequency of an SS/PBCH block to be used for the serving cell, wherein the absolute frequency of the SS/PBCH block to be used for the serving cell matches the SS/PBCH block frequency of the measurement object;
        obtaining parameters to perform cell quality derivation for the serving cell of the UE from the measurement object; and
        performing cell quality derivation for the serving cell based on the obtained parameters;
        wherein the parameters comprise an absolute threshold for a reference signal type.

15. The UE of claim 14, wherein the parameters comprise a maximum number of beams to be averaged.

16. The UE of claim 14, wherein the parameters comprise a beam consolidation threshold.

17. The UE of claim 14, wherein the parameters comprise absThreshSS-BlocksConsolidation.

18. The UE of claim 14, wherein the parameters comprise an absolute threshold for consolidation of measurement results per Synchronization Signal Block, SSB.

19. The UE of claim 14, wherein the parameters comprise absThreshSS-BlocksConsolidation and nrofSS-BlocksToAverage, and performing cell quality derivation for the serving cell based on the obtained parameters comprises, for each cell measurement quantity to be derived based on SS/PBCH block:
    deriving each cell measurement quantity based on SS/PBCH block as a linear average of power values of a number of highest beam measurement quantity values above absThreshSS-BlocksConsolidation where a total number of averaged beams shall not exceed nrofSS-BlocksToAverage.

20. The UE of claim 14, wherein the parameters comprise a threshold that defines beams to be reported.

21. The UE of claim 14, wherein the parameters comprise a threshold that defines beams to be averaged with a best beam.

22. The UE of claim 14, wherein the serving cell configuration comprises a ServingCellConfigCommon information element.

23. The UE of claim 14, wherein the specified absolute frequency comprises an absoluteFrequencySSB parameter included in a FrequencyInfoDL information element of the serving cell configuration.

24. The UE of claim 14, wherein the RRC signaling comprises an RRC Reconfiguration message.

25. The UE of claim 14, wherein the measurement configuration comprises a MeasConfig information element.

26. The UE of claim 14, wherein the measurement object comprises a MeasObjectNR information element.

27. A non-transitory computer readable medium having stored thereon machine-readable instructions executable to cause a User Equipment (UE) to perform operations comprising:
    obtaining, via Radio Resource Control (RRC) signaling from a network node, a measurement configuration that includes a list of measurement objects, wherein the list of measurement objects includes a measurement object of a serving cell, the measurement object of the serving cell specifying a Synchronization Signal/Physical Broadcast Channel block (SS/PBCH block) frequency;
    obtaining a serving cell configuration of the serving cell, the serving cell configuration providing frequency information that specifies an absolute frequency of an SS/PBCH block to be used for the serving cell, wherein the absolute frequency of the SS/PBCH block to be used for the serving cell matches the SS/PBCH block frequency of the measurement object;
    obtaining parameters to perform cell quality derivation for the serving cell of the UE from the measurement object; and
    performing cell quality derivation for the serving cell based on the obtained parameters;
    wherein the parameters comprise an absolute threshold for a reference signal type.

* * * * *